(12) United States Patent
Yamada et al.

(10) Patent No.: US 9,085,653 B2
(45) Date of Patent: Jul. 21, 2015

(54) METHOD FOR PRODUCING MODIFIED CONJUGATED DIENE-BASED POLYMER, MODIFIED CONJUGATED DIENE-BASED POLYMER, MODIFIED CONJUGATED DIENE-BASED POLYMER COMPOSITION, RUBBER COMPOSITION AND TIRE

(75) Inventors: Chigusa Yamada, Tokyo (JP); Junichi Yoshida, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 14/342,555

(22) PCT Filed: Aug. 28, 2012

(86) PCT No.: PCT/JP2012/071730
§ 371 (c)(1),
(2), (4) Date: Apr. 16, 2014

(87) PCT Pub. No.: WO2013/035589
PCT Pub. Date: Mar. 14, 2013

(65) Prior Publication Data
US 2014/0213721 A1  Jul. 31, 2014

(30) Foreign Application Priority Data
Sep. 8, 2011 (JP) .................................. 2011-195867

(51) Int. Cl.
| C08K 3/26 | (2006.01) |
| C08F 36/04 | (2006.01) |
| B60C 1/00 | (2006.01) |
| C08F 236/10 | (2006.01) |
| C08C 19/44 | (2006.01) |
| C08K 3/36 | (2006.01) |

(52) U.S. Cl.
CPC ............. *C08F 236/10* (2013.01); *B60C 1/0016* (2013.04); *C08C 19/44* (2013.01); *C08F 36/04* (2013.01); *C08K 3/36* (2013.01)

(58) Field of Classification Search
CPC ......... C08K 3/36; C08L 15/00; C08F 369/04; C08F 4/48
USPC ............................. 525/102; 524/572; 152/151
See application file for complete search history.

(56) References Cited

U.S. PATENT DOCUMENTS

| 5,705,571 A * | 1/1998 | Tsiang et al. ................. 525/338 |
| 2003/0199669 A1 | 10/2003 | Saito et al. |
| 2004/0254301 A1 | 12/2004 | Tsukimawashi et al. |
| 2005/0203251 A1 | 9/2005 | Oshima et al. |
| 2006/0173138 A1 | 8/2006 | Hogan et al. |
| 2009/0111933 A1 | 4/2009 | Yamada et al. |
| 2011/0112212 A1 | 5/2011 | Kimura et al. |

FOREIGN PATENT DOCUMENTS

| EP | 2003146 A2 | 12/2008 |
| JP | H11-189616 A | 7/1999 |
| JP | 2001-131230 A | 5/2001 |
| JP | 2003-171418 A | 6/2003 |
| JP | 2005-290355 A | 10/2005 |
| JP | 2008-527150 A | 7/2008 |
| JP | 2009-263587 A | 11/2009 |
| JP | 2009-287020 A | 12/2009 |
| JP | 2009287020 A * | 12/2009 |
| JP | 2010-241983 A | 10/2010 |
| JP | 2010-280865 A | 12/2010 |
| JP | 2011-006543 A | 1/2011 |
| WO | 01/23467 A1 | 4/2001 |
| WO | 2006/104215 A1 | 10/2006 |
| WO | 2007/114203 A | 10/2007 |
| WO | 2009/072650 A1 | 6/2009 |

* cited by examiner

*Primary Examiner* — Kelechi Egwim
(74) *Attorney, Agent, or Firm* — Morgan, Lewis & Bockius LLP

(57) ABSTRACT

A method for producing a modified conjugated diene-based polymer including
  a polymerization step of obtaining a conjugated diene-based polymer having an active end by use of a polymerization initiator containing a compound having at least one nitrogen atom in a molecule and an organic lithium compound; and
  a modification step of reacting a modifier represented by the following chemical formula (6) with the active end of the conjugated diene-based polymer:

[Formula 1]

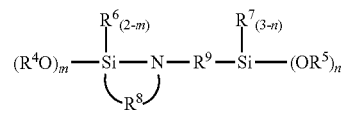

(6)

wherein $R^4$ to $R^7$ each independently represent an alkyl group having 1 to 20 carbon atoms or an aryl group having 6 to 20 carbon atoms; $R^8$ represents an alkylene group having 3 to 10 carbon atoms; $R^9$ represents an alkylene group having 1 to 20 carbon atoms; m is an integer of 1 or 2; and n is an integer of 2 or 3.

13 Claims, No Drawings

METHOD FOR PRODUCING MODIFIED CONJUGATED DIENE-BASED POLYMER, MODIFIED CONJUGATED DIENE-BASED POLYMER, MODIFIED CONJUGATED DIENE-BASED POLYMER COMPOSITION, RUBBER COMPOSITION AND TIRE

TECHNICAL FIELD

The present invention relates to a method for producing a modified conjugated diene-based polymer, a modified conjugated diene-based polymer, a modified conjugated diene-based polymer composition, rubber composition and tire.

BACKGROUND ART

Recently, environmental concern such as reduction of carbon-dioxide emissions has been societal demand. In particular, developing automobiles being fuel-efficient has been increasingly demanded. In the circumstance, it has been desired to develop a material having low rolling-resistance as a material for automobile tires, in particular, for tire tread, which is in contact with the ground surface.

In contrast, from the viewpoint of safety, developing a material having excellent wet skid resistance, and sufficient abrasion resistance and breaking properties in practice has been demanded.

Conventionally, as a reinforcing filler for tire tread, e.g., carbon black and silica have been used.

Use of silica is advantageous since low hysteresis loss property and wet skid resistance can be improved. However, the surface of silica is hydrophilic although the surface of carbon black is hydrophobic. Because of this, silica has drawbacks of low affinity for a conjugated diene rubber and low dispersibility, compared to carbon black. To improve dispersibility and bond silica a conjugated diene rubber, it is necessary to separately add e.g., a silane coupling agent.

Moreover, recently, an attempt has been made to improve dispersibility of silica in a rubber-like polymer by introducing a functional group having affinity and reactivity to silica to an active end of the rubber-like polymer. A further attempt has been made to reduce hysteresis loss by ending a modified end of a polymer by binding of a silica particle.

For example, Patent Literature 1 proposes a modified diene rubber obtained by reacting a modifier having a glycidylamino group with an active end of a polymer.

Patent Literatures 2 to 4 propose a modified diene rubber obtained by reacting an alkoxysilane containing an amino group with an active end of a polymer, and a composition containing the modified diene rubber and silica.

Patent Literature 5 proposes a modified diene rubber functionalized by reacting a cyclic azasilane compound with an active end of a polymer.

Patent Literature 6 proposes a modified diene rubber obtained by coupling an active end of a polymer with a multifunctional silane compound.

In the meantime, it is known that hysteresis loss can be reduced by introducing an amino group having affinity for carbon black into a polymerization initiation end of a rubber like polymer to trap the polymerization initiation end, which is mobile, on carbon black.

Moreover, Patent Literature 7 reports combination of these conventional techniques, more specifically, reports a technique for further reducing hysteresis loss of a modified rubber-like polymer composition obtained from a modified rubber-like polymer, by introducing an amino group having affinity for carbon black into the polymerization initiation end of a rubber-like polymer and introducing an alkoxysilane having an amino group into the polymerization termination end to trap the two terminals with silica and carbon black, respectively.

CITATION LIST

Patent Literature

Patent Literature 1: International Publication No. WO 01/23467
Patent Literature 2: Japanese Patent Laid-Open No. 2005-290355
Patent Literature 3: Japanese Patent Laid-Open No. H11-189616
Patent Literature 4: Japanese Patent Laid-Open No. 2003-171418
Patent Literature 5: National Publication of International Patent Application No. 2008-527150
Patent Literature 6: International Publication No. WO 07/114,203
Patent Literature 7: Japanese Patent Laid-Open No. 2001-131230

SUMMARY OF INVENTION

Technical Problem

The modified diene rubbers disclosed in Patent Literatures 1 to 6 exert an hysteresis loss reducing effect when it is blended with silica to prepare a composition; however, these rubbers still have room for improvement and further improvement is desired.

The modified diene rubber disclosed in Patent Literature 7 exerts an effect of further reducing hysteresis loss by introducing functional groups into the two ends; however, the reactions between the modification groups on the ends of molecular chains of the modified diene rubber and an inorganic filler such as silica proceed during kneading, increasing viscosity. As a result, it becomes difficult to knead a composition. In addition, when the composition is processed into a sheet after kneading, the surface of the sheet tends to be roughened and breakage of the sheet easily occurs. Likewise, there is a problem in that processability tends to deteriorate.

Solution to Problem

The present invention was made in consideration of the circumstances of the prior art. An object of the present invention is to provide a modified conjugated diene-based polymer, which provides a vulcanizate having excellent balance between low hysteresis loss property and wet skid resistance, sufficient abrasion resistance and break strength in practice, and excellent processability, and provide a production method thereof and a modified conjugated diene-based polymer composition.

More specifically, the present invention is as follows.

The present inventors made intensive studies with a view to solving the above problems of the prior art. As a result, they found that a modified conjugated diene-based polymer and a composition thereof, which can solve the aforementioned problems of the prior art, can be obtained by a method for producing a modified conjugated diene-based polymer, having a polymerization step of obtaining a conjugated diene-based polymer having an active end by polymerizing or copolymerizing a conjugated diene compound or a conjugated diene compound and an aromatic vinyl compound by use of a polymerization initiator containing a compound, which has a specific structure and at least one nitrogen atom in a molecule, and an organic lithium compound; and a modification step of reacting a compound having a specific structure with the active end of the conjugated diene-based polymer. Based on the finding, the present invention was accomplished.

More specifically, the present invention is as follows.

[1] A method for producing a modified conjugated diene-based polymer comprising a polymerization step of obtaining a conjugated diene-based polymer having an active end by polymerizing or copolymerizing a conjugated diene compound or a conjugated diene compound and an aromatic vinyl compound by use of a polymerization initiator containing a compound represented by the following chemical formula (1) or (2) and having at least one nitrogen atom in a molecule and an organic lithium compound; and a modification step of reacting a modifier represented by the following chemical formula (6) with the active end of the conjugated diene-based polymer.

[Formula 1]

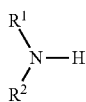

(1)

In the formula (1), $R^1$ and $R^2$, which may be the same or different, each represent any selected from the group consisting of an alkyl group having 1 to 12 carbon atoms, a cycloalkyl group having 3 to 14 carbon atoms and an aralkyl group having 6 to 20 carbon atoms; and $R^1$ and $R^2$ may bind to form a cyclic structure together with an adjacent nitrogen atom; and in this case $R^1$ and $R^2$ are hydrocarbon groups having 5 to 12 carbon atoms in total and may have an unsaturated bond and a branched structure.

[Formula 2]

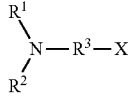

(2)

In the formula (2), $R^1$ and $R^2$ are the same as defined in the formula (1); $R^3$ is either an alkylene group having 1 to 20 carbon atoms or a group represented by any one of formulas (3) to (5); when $R^3$ is an alkylene group having 1 to 20 carbon atoms, X represents any one of Cl, Br and I; and when $R^3$ is a group represented by any one of the following formulas (3) to (5), X is a hydrogen atom.

[Formula 3]

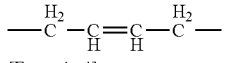

(3)

[Formula 4]

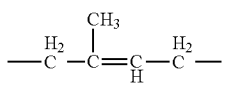

(4)

[Formula 5]

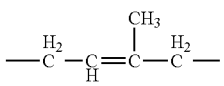

(5)

[Formula 6]

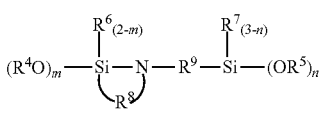

(6)

wherein $R^4$ to $R^7$ each independently represent an alkyl group having 1 to 20 carbon atoms or an aryl group having 6 to 20 carbon atoms; $R^8$ represents an alkylene group having 3 to 10 carbon atoms; $R^9$ represents an alkylene group having 1 to 20 carbon atoms; m is an integer of 1 or 2; and n is an integer of 2 or 3.

[2] The method for producing a modified conjugated diene-based polymer according to [1], wherein the polymerization initiator to be used in the polymerization step contains an organic lithium compound represented by the following chemical formula (7) or (8) and having, in a molecule, at least one nitrogen atom, which is obtained by reacting the compound having at least one nitrogen atom in a molecule with the organic lithium compound.

[Formula 7]

(7)

In the formula (7), $R^1$ and $R^2$, which may be the same or different, each represent any selected from the group consisting of an alkyl group having 1 to 12 carbon atoms, a cycloalkyl group having 3 to 14 carbon atoms and an aralkyl group having 6 to 20 carbon atoms; and $R^1$ and $R^2$ may bind to form a cyclic structure together with an adjacent nitrogen atom; and in this case $R^1$ and $R^2$ are hydrocarbon groups having 5 to 12 carbon atoms in total and may have an unsaturated bond and a branched structure.

[Formula 8]

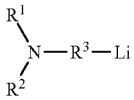

(8)

In the formula (8), $R^1$ and $R^2$ are the same as defined in the formula (7); $R^3$ is an alkylene group having 1 to 20 carbon atoms or represented by any one of the following formulas (3) to (5).

[Formula 9]

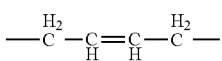

(3)

-continued

[Formula 10]

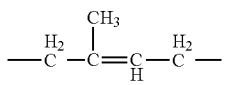
(4)

[Formula 11]

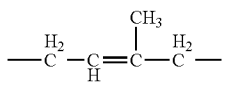
(5)

[3] The method for producing a modified conjugated diene-based polymer according to [1] or [2], wherein
the polymerization step comprise a step of obtaining a conjugated diene-based polymer having an active end by simultaneously adding
the compound represented by the following chemical formula (1) or (2) and having at least one nitrogen atom in a molecule,
the organic lithium compound, and
the conjugated diene compound or the conjugated diene compound and an aromatic vinyl compound, and performing polymerization or copolymerization.

[Formula 12]

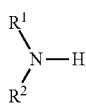
(1)

In the formula (1), $R^1$ and $R^2$, which may be the same or different, each represent any selected from the group consisting of an alkyl group having 1 to 12 carbon atoms, a cycloalkyl group having 3 to 14 carbon atoms and an aralkyl group having 6 to 20 carbon atoms.
$R^1$ and $R^2$ may bind to form a cyclic structure together with an adjacent nitrogen atom; and in this case $R^1$ and $R^2$ are hydrocarbon groups having 5 to 12 carbon atoms in total and may have an unsaturated bond and a branched structure.

[Formula 13]

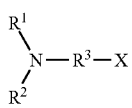
(2)

In the formula (2), $R^1$ and $R^2$ are the same as defined in the formula (1); $R^3$ is either an alkylene group having 1 to 20 carbon atoms or a group represented by any one of formulas (3) to (5); when $R^3$ is an alkylene group having 1 to 20 carbon atoms, X represents any one of Cl, Br and I; and when $R^3$ is a group represented by any one of the following formulas (3) to (5), X is a hydrogen atom.

[Formula 14]

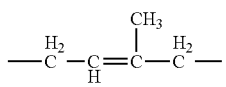
(3)

[Formula 15]

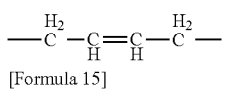
(4)

[Formula 16]

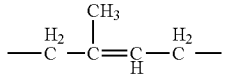
(5)

[4] The method for producing a modified conjugated diene-based polymer according to any one of [1] to [3], wherein in the formula (6), m is 2 and n is 3.

[5] A modified conjugated diene-based polymer obtained by the method for producing the modified conjugated diene-based polymer according to any one of [1] to [4].

[6] A modified conjugated diene-based polymer composition containing
100 parts by mass of a rubber component containing 20 parts by mass or more of the modified conjugated diene-based polymer according to [5]; and
0.5 to 300 parts by mass of a silica inorganic filler.

[7] A rubber composition obtained by crosslinking the modified conjugated diene-based polymer composition according to [6].

[8] A tire comprising the rubber composition according to [7].

Advantageous Effects of Invention

According to the present invention, it is possible to provide a modified conjugated diene-based polymer, which provides a vulcanizate having excellent balance between low hysteresis loss property and wet skid resistance, sufficient abrasion resistance and break strength in practice, and excellent processability, and provide a production method thereof and a modified conjugated diene-based polymer composition.

DESCRIPTION OF EMBODIMENTS

Now, an embodiment (hereinafter referred to simply as "the embodiment") for carrying out the present invention will be more specifically described below. The following embodiment is an illustration for describing the present invention and will not be construed as limiting the present invention to the following content. The present invention can be appropriately modified and carried out within the scope of the present invention.

[Method for Producing Modified Conjugated Diene-Based Polymer]

A method for producing a modified conjugated diene-based polymer according to the embodiment has
a polymerization step of obtaining a conjugated diene-based polymer having an active end by polymerizing or copolymerizing a conjugated diene compound or a conjugated diene compound and an aromatic vinyl compound by use of a polymerization initiator containing a compound represented by the following chemical formula (1) or (2) and having at least one nitrogen atom in a molecule, and an organic lithium compound; and
a modification step of reacting a modifier represented by the following chemical formula (6) with the active end of the conjugated diene-based polymer.

[Formula 17]

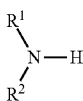
(1)

In the above formula (1), $R^1$ and $R^2$, which may be the same or different, each represent any selected from the group consisting of an alkyl group having 1 to 12 carbon atoms, a cycloalkyl group having 3 to 14 carbon atoms and an aralkyl group having 6 to 20 carbon atoms; and $R^1$ and $R^2$ may bind to form a cyclic structure together with the adjacent nitrogen atom; and in this case $R^1$ and $R^2$ are hydrocarbon groups having 5 to 12 carbon atoms in total and may have an unsaturated bond and a branched structure.

[Formula 18]

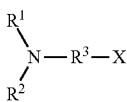
(2)

In the above formula (2), $R^1$ and $R^2$ are the same as defined in the above formula (1); $R^3$ is either an alkylene group having 1 to 20 carbon atoms or a group represented by any one of formulas (3) to (5); when $R^3$ is an alkylene group having 1 to 20 carbon atoms, X represents any one of Cl, Br and I; and when $R^3$ is a group represented by any one of the following formulas (3) to (5), X is a hydrogen atom.

[Formula 19]

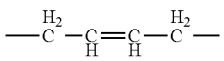
(3)

[Formula 20]

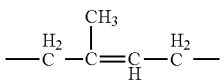
(4)

[Formula 21]

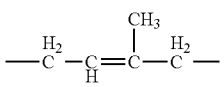
(5)

[Formula 22]

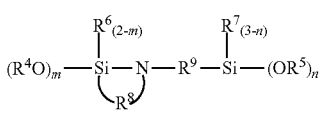
(6)

In the formula (6), $R^4$ to $R^7$ each independently represent an alkyl group having 1 to 20 carbon atoms or an aryl group having 6 to 20 carbon atoms; $R^8$ represents an alkylene group having 3 to 10 carbon atoms; $R^9$ represents an alkylene group having 1 to 20 carbon atoms; m is an integer of 1 or 2; and n is an integer of 2 or 3.

A conjugated diene-based polymer constituting a modified conjugated diene-based polymer obtained by the method for producing a modified conjugated diene-based polymer according to the embodiment is a polymer of a single type of conjugated diene compound or a polymer of different types of conjugated diene compounds, i.e., a copolymer or a copolymer of a conjugated diene compound and an aromatic vinyl compound.

(Polymerization Step)

In the polymerization step, a conjugated diene-based polymer having an active end is obtained by polymerizing or copolymerizing a conjugated diene compound or a conjugated diene compound and an aromatic vinyl compound by use of a polymerization initiator containing a compound represented by the above chemical formula (1) or (2) and having at least one nitrogen atom in a molecule, and an organic lithium compound.

<Polymerization Initiator>

In the embodiment, a predetermined polymerization initiator containing a compound having at least one nitrogen atom in a molecule and an organic lithium compound is used.

The polymerization initiator contains an organic lithium compound represented by formula (7) or (8) (described later) and having at least one nitrogen atom (in a molecule), which is obtained by reacting a compound having at least one nitrogen atom in a molecule with an organic lithium compound, and may contain an organic lithium compound having no nitrogen atom. The organic lithium compound represented by the formula (7) or (8) and having at least one nitrogen atom in a molecule may be previously prepared in a predetermined reactor, or may be produced simultaneously with or prior to polymerization or copolymerization by supplying a compound having at least one nitrogen atom in a molecule, and an organic lithium compound to a reactor for use in the polymerization or copolymerization (described later), and reacting them.

[Compound Having at Least One Nitrogen Atom in a Molecule]

As the compound having at least one nitrogen atom in a molecule, a compound represented by the following formula (1) or (2) is used.

[Formula 23]

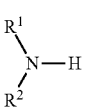
(1)

In the above formula (1), $R^1$ and $R^2$, which may be the same or different, each represent any selected from the group consisting of an alkyl group having 1 to 12 carbon atoms, a cycloalkyl group having 3 to 14 carbon atoms and an aralkyl group having 6 to 20 carbon atoms.

Examples of the groups represented by $R^1$ and $R^2$ include, but not limited to, methyl, ethyl, propyl, butyl, octyl, cyclopropyl, cyclohexyl, 3-phenyl-1-propyl, isobutyl, decyl, heptyl and phenyl groups.

Examples of a compound represented by the above formula (1) include, but not limited to, dimethylamine, diethylamine, dibutylamine, dipropylamine, diheptylamine, dihexylamine, dioctylamine, di-2-ethylhexylamine, didecylamine, ethylpropylamine, ethylbutylamine, ethylbenzylamine and methylphenethylamine. As long as the aforementioned conditions of the formula (1) are satisfied, analogous compounds to these may be included.

From the viewpoint of reducing hysteresis loss of a modified conjugated diene-based polymer composition described later and reducing unpleasant odor of a modified conjugated diene-based polymer described later, dibutylamine and dihexylamine are preferable and dibutyl amine is more preferable.

In the above formula (1), groups represented by $R^1$ and $R^2$ may bind to form a cyclic structure together with the adjacent nitrogen atom; and in this case $R^1$ and $R^2$ are hydrocarbon groups having 5 to 12 carbon atoms in total and may have an unsaturated bond and a branched structure.

In the case where groups represented by $R^1$ and $R^2$ bind, examples of a compound represented by the above formula (1) include, but not limited to, piperidine, hexamethyleneimine, azacyclooctane, 1,3,3-trimethyl-6-azabicyclo[3.2.1]octane and 1,2,3,6-tetrahydropyridine. As long as the aforementioned conditions are satisfied, analogous compounds to these may be included.

From the viewpoint of reducing hysteresis loss of a modified conjugated diene-based polymer composition described later and reducing unpleasant odor of a modified conjugated diene-based polymer described later, piperidine, hexamethyleneimine, azacyclooctane and 1,3,3-trimethyl-6-azabicyclo[3.2.1]octane are preferable and piperidine and hexamethyleneimine are more preferable.

[Formula 24]

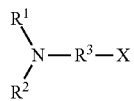

(2)

In the above formula (2), $R^1$ and $R^2$ are the same as defined in the above formula (1); $R^3$ is either an alkylene group having 1 to 20 carbon atoms or a group represented by any one of the following formulas (3) to (5); and when $R^3$ is an alkylene group having 1 to 20 carbon atoms, X represents any one of Cl, Br and I.

From the viewpoint of reactivity and interaction with an inorganic filler such as carbon black and silica, the number of carbon atoms of a group represented by $R^3$ is preferably 2 to 16 and more preferably 3 to 10.

In this case, examples of a compound represented by the above formula (2) include, but not limited to, 3-chloro-dimethylpropan-1-amine, 3-chloro-diethylpropan-1-amine, 3-chloro-dibutylpropan-1-amine, 3-chloro-dipropylpropan-1-amine, 3-chloro-diheptylpropan-1-amine, 3-chloro-dihexylpropan-1-amine, 3-chloro-propyl-ethylhexan-1-amine, 3-chloro-didecylpropan-1-amine, 3-chloro-ethylpropan-1-amine, 3-chloro-ethylbutan-1-amine, 3-chloro-ethylpropan-1-amine, benzyl-3-chloro-ethylpropan-1-amine, 3-chloro-ethylphenethylpropan-1-amine, 3-chloro-methylphenethylpropan-1-amine, 1-(3-chloropropyl)piperidine, 1-(3-chloropropyl)hexamethyleneimine, 1-(3-chloropropyl)azacyclooctane, 6-(3-chloropropyl)-1,3,3-trimethyl-6-azabicyclo[3.2.1]octane, 1-(3-chloropropyl)-1,2,3,6-tetrahydropyridine, 1-(3-bromopropyl)hexamethyleneimine, 1-(3-iodopropyl)hexamethyleneimine, 1-(3-chlorobutyl)hexamethyleneimine, 1-(3-chloropentyl)hexamethyleneimine, 1-(3-chlorohexyl)hexamethyleneimine and 1-(3-chlorodecyl)hexamethyleneimine. As long as the aforementioned conditions are satisfied, analogous compounds to these may be included.

From the viewpoint of reactivity and interaction with an inorganic filler such as carbon black and silica, 3-chloro-dibutylpropan-1-amine and 1-(3-chloropropyl)hexamethyleneimine are preferable, and 1-(3-chloropropyl)piperidine and 1-(3-chloropropyl)hexamethyleneimine are more preferable.

In the above formula (2), when $R^3$ is a group represented by any one of the following formulas (3) to (5), X is a hydrogen atom.

[Formula 25]

(3)

[Formula 26]

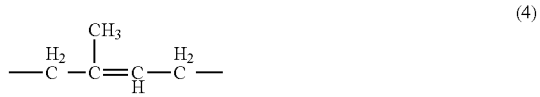

(4)

[Formula 27]

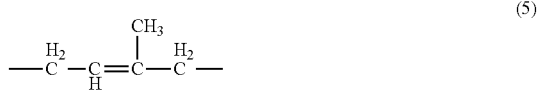

(5)

In this case, examples of a compound represented by the above formula (2) include, but not limited to, N,N-dimethyl-2-butenyl-1-amine, N,N-diethyl-2-butenyl-1-amine, N,N-dibutyl-2-butenyl-1-amine, N,N-dipropyl-2-butenyl-1-amine, N,N-diheptyl-2-butenyl-1-amine, N,N-dihexyl-2-butenyl-1-amine, N,N-dioctyl-2-butenyl-1-amine, N,N-(di-2-ethylhexyl)-2-butenyl-1-amine, N,N-didecyl-2-butenyl-1-amine, N,N-ethylpropyl-2-butenyl-1-amine, N,N-ethylbutyl-2-butenyl-1-amine, N,N-ethylbenzyl-2-butenyl-1-amine, N,N-methylphenethyl-2-butenyl-1-amine, N,N-dimethyl-2-methyl-2-butenyl-1-amine, N,N-diethyl-2-methyl-2-butenyl-1-amine, N,N-dibutyl-2-methyl-2-butenyl-1-amine, N,N-dipropyl-2-methyl-2-butenyl-1-amine, N,N-diheptyl-2-methyl-2-butenyl-1-amine, N,N-dihexyl-2-methyl-2-butenyl-1-amine, N,N-dimethyl-3-methyl-2-butenyl-1-amine, N,N-diethyl-3-methyl-2-butenyl-1-amine, N,N-dibutyl-3-methyl-2-butenyl-1-amine, N,N-dipropyl-3-methyl-2-butenyl-1-amine, N,N-diheptyl-3-methyl-2-butenyl-1-amine, N,N-dihexyl-3-methyl-2-butenyl-1-amine, 1-(2-butenyl)piperidine, 1-(2-butenyl)hexamethyleneimine, 1-(2-butenyl)azacyclooctane, 6-(2-butenyl)-1,3,3-trimethyl-6-azabicyclo[3.2.1]octane, 1-(2-butenyl)-1,2,3,6-tetrahydropyridine, (2-methyl-2-butenyl)hexamethyleneimine and (3-methyl-2-butenyl)hexamethyleneimine. As long as the aforementioned conditions are satisfied, analogous compounds to these may be included.

From the viewpoint of reducing hysteresis loss of a modified conjugated diene-based polymer composition described later, N,N-dibutyl-2-butenyl-1-amine and 1-(2-butenyl)hexamethyleneimine are preferable, and 1-(2-butenyl)piperidine and 1-(2-butenyl)hexamethyleneimine are more preferable.

[Organic Lithium Compound]

Examples of the organic lithium compound include, but not limited to, n-butyllithium, sec-butyllithium, tert-butyllithium, n-propyllithium and iso-propyllithium.

[Organic Lithium Compound Having at Least One Nitrogen Atom in a Molecule]

As the organic lithium compound having at least one nitrogen atom in a molecule, which is obtained by reacting a compound having at least one nitrogen atom in a molecule as mentioned above and an organic lithium compound as mentioned above, a compound polymerizable by anion polymerization and represented by the following formula (7) or (8) can be used.

[Formula 28]

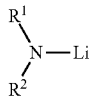

(7)

In the above formula (7), $R^1$ and $R^2$, which may be the same or different, each represent any selected from the group consisting of an alkyl group having 1 to 12 carbon atoms, a cycloalkyl group having 3 to 14 carbon atoms and an aralkyl group having 6 to 20 carbon atoms.

Examples of groups represented by $R^1$ and $R^2$ include, but not limited to, methyl, ethyl, propyl, butyl, octyl, cyclopropyl, cyclohexyl, 3-phenyl-1-propyl, isobutyl, decyl, heptyl and phenyl groups.

Examples of a compound represented by the above formula (7) include, but not limited to, dimethylaminolithium diethylaminolithium, dibutylaminolithium, dipropylaminolithium, diheptylaminolithium, dihexylaminolithium, dioctylaminolithium, di-2-ethylhexylaminolithium, didecylaminolithium, ethylpropylaminolithium, ethylbutylaminolithium, ethylbenzylaminolithium and methylphenethylaminolithium. As long as the aforementioned conditions are satisfied, analogous compounds to these may be included.

From the viewpoint of solubility to a solvent and reducing hysteresis loss of a modified conjugated diene-based polymer composition described later, dibutylaminolithium and dihexylaminolithium are preferable and dibutylaminolithium is more preferable.

In the above formula (7), groups represented by $R^1$ and $R^2$ may bind to form a cyclic structure together with the adjacent nitrogen atom; and in this case $R^1$ and $R^2$ are hydrocarbon groups having 5 to 12 carbon atoms in total and may have an unsaturated bond and a branched structure.

In the case where groups represented by $R^1$ and $R^2$ bind, examples of a compound represented by the above formula (7) include, but not limited to, piperidinolithium, hexamethyleneiminolithium, lithium azacyclooctane, lithium-1,3,3-trimethyl-6-azabicyclo[3.2.1]octane and 1,2,3,6-tetrahydropyridinolithium. As long as the aforementioned conditions are satisfied, analogous compounds to these may be included.

From the viewpoint of solubility of a polymerization initiator to a solvent and reducing unpleasant odor of a modified conjugated diene-based polymer described later, piperidinolithium, hexamethyleneiminolithium, lithiumazacyclooctane, lithium-1,3,3-trimethyl-6-azabicyclo[3.2.1]octane are preferable and piperidinolithium and hexamethyleneiminolithium are more preferable.

[Formula 29]

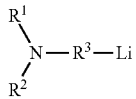

(8)

In the above formula (8), $R^1$ and $R^2$, which may be the same or different, each represent any selected from the group consisting of an alkyl group having 2 to 12 carbon atoms, a cycloalkyl group having 3 to 14 carbon atoms and an aralkyl group having 6 to 20 carbon atoms.

$R^3$ is either an alkylene group having 1 to 20 carbon atoms or a group represented by any one of the following formulas (3) to (5).

[Formula 30]

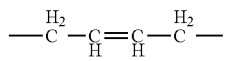

(3)

[Formula 31]

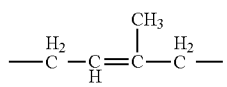

(4)

[Formula 32]

$$-\underset{H_2}{C}-\underset{H}{C}=\underset{}{\overset{CH_3}{C}}-\underset{H_2}{C}-$$

(5)

In the case where $R^3$ is an alkylene group having 1 to 20 carbon atoms, from the viewpoint of reactivity and interaction with an inorganic filler such as carbon black and silica, the number of carbon atoms of $R^3$ is preferably 2 to 16, and more preferably 3 to 10.

In the case where $R^3$ is an alkylene group having 1 to 20 carbon atoms, examples of a compound represented by the above formula (8) include, but not limited to, (3-(dimethylamino)-propyl)lithium, (3-(diethylamino)-propyl)lithium, (3-(dipropylamino)-propyl)lithium, (3-(dibutylamino)-propyl)lithium, (3-(dipentylamino)-propyl)lithium, (3-(dihexylamino)-propyl)lithium, (3-(dioctylamino)-propyl)lithium, (3-(ethylhexylamino)-propyl)lithium, (3-(didecylamino)-propyl)lithium, (3-(ethylpropylamino-propyl)lithium, (3-(ethylbutylamino-propyl)lithium, (3-(ethylbenzylamino)-propyl)lithium, (3-(methylphenethylamino)-propyl)lithium, (4-(dibutylamino)-butyl)lithium, (5-(dibutylamino)-pentyl)lithium, (6-(dibutylamino)-hexyl)lithium and (10-(dibutylamino)-decyl)lithium. As long as the aforementioned conditions are satisfied, analogous compounds to these may be included.

From the viewpoint of reactivity and interaction with an inorganic filler such as carbon black and silica, (3-(dibutylamino)-propyl)lithium is more preferable.

If $R^3$ is a group represented by any one of formulas (3) to (5), examples of a compound represented by the above formula (8) include, but not limited to, (4-(dimethylamino)-2-butenyl)lithium, (4-(diethylamino)-2-butenyl)lithium, (4-(dibutylamino)-2-butenyl)lithium, (4-(dipropylamino)-2-butenyl)lithium, (4-(diheptylamino)-2-butenyl)lithium, (4-(dihexylamino)-2-butenyl)lithium, (4-(dioctylamino)-2-butenyl)lithium, (4-(di-2-ethylhexylamino)-2-butenyl)lithium, (4-(didecylamino)-2-butenyl)lithium, (4-(ethylpropylamino)-2-butenyl)lithium, (4-(ethylbutylamino)-2-butenyl)lithium, (4-(ethylbenzylamino)-2-butenyl)lithium, (4-(methylphenethylamino)-2-butenyl)lithium, (4-(dimethylamino)-2-methyl-2-butenyl)lithium, (4-(diethylamino)-2-methyl-2-butenyl)lithium, (4-(dibutylamino)-2-methyl-2-butenyl)lithium, (4-

(dipropylamino)-2-methyl-2-butenyl)lithium, (4-(diheptylamino)-2-methyl-2-butenyl)lithium, (4-(dihexylamino)-2-methyl-2-butenyl)lithium, (4-(dimethylamino)-3-methyl-2-butenyl)lithium, (4-(diethylamino)-3-methyl-2-butenyl)lithium, (4-(dibutylamino)-3-methyl-2-butenyl)lithium, (4-(dipropylamino)-3-methyl-2-butenyl)lithium, (4-(diheptylamino)-3-methyl-2-butenyl)lithium and (4-(dihexylamino)-3-methyl-2-butenyl)lithium. As long as the aforementioned conditions are satisfied, analogous compounds to these may be included.

From the viewpoint of reactivity as a polymerization initiator, (4-(dimethylamino)-2-butenyl)lithium, (4-(diethylamino)-2-butenyl)lithium and (4-(dibutylamino)-2-butenyl) lithium are preferable and (4-(dibutylamino)-2-butenyl) lithium is more preferable.

In the above formula (8), groups represented by $R^1$ and $R^2$ may bind to form a cyclic structure together with the adjacent nitrogen atom; and in this case $R^1$ and $R^2$ are hydrocarbon groups having 5 to 12 carbon atoms in total and may have an unsaturated bond and a branched structure.

In the case where groups represented by $R^1$ and $R^2$ bind, examples of a compound represented by the formula (8) include, but not limited to, (3-(piperidinyl)propyl)lithium, (3-(hexamethyleneiminyl)propyl)lithium, (3-(heptamethyleneiminyl)propyl)lithium, (3-(octamethyleneiminyl)propyl) lithium, (3-(1,3,3-trimethyl-6-azabicyclo[3.2.1]octanyl)propyl)lithium, (3-(1,2,3,6-tetrahydropyridinyl)propyl)lithium, (2-(hexamethyleneiminyl)ethyl)lithium, (4-(hexamethyleneiminyl)butyl)lithium, (5-(hexamethyleneiminyl)pentyl) lithium, (6-(hexamethyleneiminyl)hexyl)lithium, (10-(hexamethyleneiminyl)decyl)lithium, (4-(piperidinyl)-2-butenyl) lithium, (4-(hexamethyleneiminyl)-2-butenyl)lithium, (4-(heptamethyleneiminyl)-2-butenyl)lithium, (4-(octamethyleneiminyl)-2-butenyl)lithium, (4-(1,3,3-trimethyl-6-azabicyclo[3.2.1]octanyl)-2-butenyl)lithium, (4-(1,2,3,6-tetrahydropyridinyl)-2-butenyl)lithium, (4-(hexamethyleneiminyl)-2-methyl-2-butenyl)lithium and (4-(hexamethyleneiminyl)-3-methyl-2-butenyl)lithium. As long as the aforementioned conditions are satisfied, analogous compounds to these may be included.

From the viewpoint of reactivity and interaction with an inorganic filler such as carbon black and silica, (3-(piperidinyl)propyl)lithium, (3-(hexamethyleneimine)propyl) lithium, (3-(1,2,3,6-tetrahydropyridinyl)propyl)lithium, (4-(piperidinyl)-2-butenyl)lithium and (4-(hexamethyleneimine)-2-butenyl)lithium are preferable, and (3-(piperidinyl)propyl)lithium, (4-(piperidinyl)-2-butenyl) lithium, (3-(hexamethyleneimine)propyl)lithium and (4-(hexamethyleneimine)-2-butenyl)lithium are more preferable.

[Method for Preparing an Organic Lithium Compound Having at Least One Nitrogen Atom in a Molecule]

An organic lithium compound represented by formula (7) or (8) and having at least one nitrogen atom in a molecule may be previously prepared before the polymerization step mentioned above. As a preparation method, a known method can be applied.

An organic lithium compound represented by the following formula (7) and having at least one nitrogen atom in a molecule is obtained, for example, by reacting a compound represented by the following formula (1) and an organic lithium compound in a hydrocarbon solvent.

[Formula 33]

(7)

In the above formula (7), $R^1$ and $R^2$, which may be the same or different, each represent any selected from the group consisting of an alkyl group having 1 to 12 carbon atoms, a cycloalkyl group having 3 to 14 carbon atoms and an aralkyl group having 6 to 20 carbon atoms.

$R^1$ and $R^2$ may bind to form a cyclic structure together with the adjacent nitrogen atom; and in this case $R^1$ and $R^2$ are hydrocarbon groups having 5 to 12 carbon atoms in total and may have an unsaturated bond and a branched structure.

[Formula 34]

(1)

$R^1$ and $R^2$ are the same as defined in the above formula (7).

As the hydrocarbon solvent, an appropriate solvent such as hexane, cyclohexane and benzene may be selected.

The reaction temperature is preferably 0 to 80° C. From the viewpoint of productivity, the reaction temperature is preferably 10 to 70° C.

An organic lithium compound having at least one nitrogen atom in a molecule and represented by the following formula (8) where $R^3$ is an alkylene group having 1 to 20 carbon atoms, is obtained by preparing a lithium amide compound by reacting, for example, an amine represented by the following formula (1) and an organic lithium compound in a hydrocarbon solvent and then reacting an alkyl dihalide represented by the following formula (9) to the lithium amide compound and further reacting an organic lithium compound.

[Formula 35]

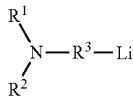

(8)

In the above formula (8), $R^1$ and $R^2$ are the same as defined in the above formula (7), and when $R^3$ is an alkylene group having 1 to 20 carbon atoms, X represents any one of Cl, Br and I.

[Formula 36]

(1)

In the above formula (1), $R^1$ and $R^2$ are the same as defined in the above formula (7).

[Formula 37]

$$X^1—R^{3a}—X^2 \quad (9)$$

In the above formula (9), $X^1$ and $X^2$ are halogen atoms of I, Br and Cl but mutually different.

If $X^1$ and $X^2$ are mutually different halogen atoms, reactivity differs. Taking advantage of different reactivity, first, a halogen atom having high reactivity is reacted with a lithium amide compound and then the remaining halogen atom is reacted with an organic lithium compound. In this manner a compound represented by the above formula (8) can be obtained.

$R^{3a}$ represents an alkylene group having 1 to 20 carbon atoms, preferably an alkylene group having 2 to 16 carbon atoms and more preferably an alkylene group having 3 to 10 carbon atoms.

Examples of a compound represented by the above formula (9) include, but not limited to, 1-bromo-3-chloropropane, 1-bromo-4-chlorobutane, 1-bromo-5-chloropentane, 1-bromo-6-chlorohexane, 1-bromo-10-chlorodecane, 1-bromo-3-iodopropane, 1-bromo-4-iodobutane, 1-bromo-5-iodopentane, 1-bromo-6-iodohexane, 1-bromo-10-iododecane, 1-chloro-3-iodopropane, 1-chloro-4-iodobutane, 1-chloro-5-iodopentane, 1-chloro-6-iodohexane and 1-chloro-10-iododecane.

From the viewpoint of reactivity and safety, 1-bromo-3-chloropropane, 1-bromo-4-chlorobutane, 1-bromo-5-chloropentane, 1-bromo-6-chlorohexane and 1-bromo-10-chlorodecane are preferable, and 1-bromo-3-chloropropane, 1-bromo-4-chlorobutane and 1-bromo-6-chlorohexane are more preferable.

The temperature of a reaction for preparing a lithium amide compound by using a compound represented by the above formula (1), an organic lithium compound and a hydrocarbon solvent is preferably 0 to 80° C. From the viewpoint of productivity, the temperature is preferably 10 to 70° C.

The temperature of a reaction of a compound represented by the above formula (9) with the lithium amide compound is preferably −78 to 70° C. and more preferably −50 to 50° C. The temperature of a reaction of an organic lithium compound with the compound obtained above is preferably −78 to 70° C. and more preferably −50 to 50° C.

In the case of an organic lithium compound having at least one nitrogen atom in a molecule and represented by the following formula (8) where $R^3$ is represented by any one of the following formulas (3) to (5), the organic lithium compound represented by the formula (8) can be synthesized by the following steps (I) to (IV).

[Formula 38]

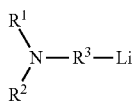

(8)

In the above formula (8), $R^1$ and $R^2$ are the same as defined in the above formula (7) and $R^3$ is represented by any one of the following formulas (3) to (5).

[Formula 39]

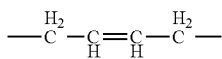

(3)

[Formula 40]

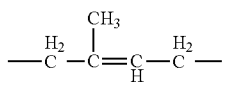

(4)

[Formula 41]

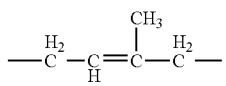

(5)

(I) Synthesizing a lithium amide compound by reacting a compound represented by the above formula (1) and having at least one nitrogen atom in a molecule with an organic lithium compound in a hydrocarbon solvent.

(II) Reacting the obtained lithium amide compound with butadiene or isoprene in a hydrocarbon solvent.

(III) Inactivating lithium by adding an alcohol and distilling the obtained product under reduced pressure.

(IV) Reacting the obtained product by distillation with an organic lithium compound in a hydrocarbon solvent.

The temperature of the reaction in step (I) of preparing a lithium amide compound by using a compound represented by the above formula (1), an organic lithium compound and a hydrocarbon solvent is preferably 0 to 80° C. From the viewpoint of productivity, the temperature is preferably 10 to 70° C.

As the alcohol, a known alcohol can be used. An alcohol having a low molecular weight such as methanol, ethanol and isopropanol is preferable and ethanol is more preferable.

The temperature of the reaction in step (IV) is preferably 0 to 80° C. and more preferably 10 to 70° C.

In preparing an organic lithium compound represented by the above formula (7) or (8) and having at least one nitrogen atom in a molecule, a polar compound may be added to the system. Owing to this, production of the lithium compound having at least one nitrogen atom in a molecule can be accelerated and the solubilization effect in a hydrocarbon solvent can be obtained.

Examples of the polar compound include, a tertiary monoamine, a tertiary diamine and a straight-chain or cyclic ether.

Examples of the tertiary monoamine include, but not limited to, compounds such as trimethylamine, triethylamine, methyldiethylamine, 1,1-dimethoxytrimethylamine, 1,1-diethoxytrimethylamine, 1,1-diethoxytriethylamine, N,N-dimethylformamidediisopropylacetal and N,N-dimethylformamidedicyclohexylacetal.

Examples of the tertiary diamine include, but not limited to, compounds such as N,N,N',N'-tetramethyldiaminomethane, N,N,N',N'-tetramethylethylenediamine, N,N,N',N'-tetramethylpropanediamine, N,N,N',N'-tetramethyldiaminobutane, N,N,N',N'-tetramethyldiaminopentane, N,N,N',N'-tetramethylhexanediamine, dipiperidinopentane and dipiperidinoethane.

Examples of the straight-chain ether include, but not limited to, dimethyl ether, diethyl ether, ethylene glycol dimethyl ether, diethylene glycol dimethyl ether, triethylene glycol dimethyl ether and tetra ethylene dimethyl ether.

Examples of the cyclic ether include, but not limited to, compounds such as tetrahydrofuran, bis(2-oxoranyl)ethane, 2,2-bis(2-oxoranyl)propane, 1,1-bis(2-oxoranyl)ethane, 2,2-bis(2-oxoranyl)butane, 2,2-bis(5-methyl-2-oxoranyl)propane, and 2,2-bis(3,4,5-trimethyl-2-oxoranyl)propane.

Among the polar compounds, from the viewpoint of acceleration of production and solubilization effect in a hydrocarbon of a organic lithium compound represented by the formula (7) or (8) and having at least one nitrogen atom in a molecule, tertiary monoamines, i.e., trimethylamine and triethylamine, a tertiary diamines, i.e., N,N,N',N'-tetramethylethylenediamine and cyclic ethers, i.e., tetrahydrofuran and 2,2-bis(2-oxoranyl)propane are preferable.

The polar compounds may be used alone or in combination of two or more.

Furthermore, when a polar compound is added in preparing an organic lithium compound represented by the above formula (7) or (8) and having at least one nitrogen atom in a molecule, the polar compound is preferably added in a ratio within the range of 30 to 50,000 ppm, and more preferably within the range of 200 to 20,000 ppm based on the solvent to be used for preparation.

To accelerate the reaction and sufficiently exert a solubilization effect in a solvent, the polar compound is preferably added in a ratio of 30 ppm or more. In consideration of freely adjusting a microstructure in the subsequent polymerization step and separation of a polymerization solvent in a step of recovering a solvent after polymerization to purify the solvent, a polar compound is preferably added in a ratio of 50,000 ppm or less.

<Polymerization or Copolymerization>

A conjugated diene-based polymer before modification can be obtained by polymerizing a conjugated diene compound or by copolymerizing a conjugated diene compound and an aromatic vinyl compound by use of a polymerization initiator containing a compound represented by the above formula (1) or (2) and having at least one nitrogen atom in a molecule and an organic lithium compound. Note that the above polymerization initiator may contain an organic lithium compound containing no nitrogen atom.

In the polymerization step, an organic lithium compound represented by the formula (7) or (8) and having at least one nitrogen atom in a molecule is previously prepared in a predetermined reactor and supplied to a reactor, in which polymerization of a conjugated diene compound or copolymerization of a conjugated diene compound and an aromatic vinyl compound is to be performed and subjected to a polymerization reaction. Alternatively, an organic lithium compound represented by the formula (7) or (8) and having at least one nitrogen atom in a molecule is prepared in a reactor for performing polymerization or copolymerization (described later) and thereafter, predetermined monomers (a conjugated diene compound and an aromatic vinyl compound) are supplied to the reactor to perform a polymerization or copolymerization reaction. Further alternatively, preparation of a polymerization initiator and polymerization or copolymerization of monomers may be simultaneously performed in a reactor for polymerization or copolymerization (described later).

The polymerization initiators, when an organic lithium compound represented by the above formula (7) or (8) and having at least one nitrogen atom in a molecule is used, may be used alone or as a mixture of two or more.

A conjugated diene-based polymer may be polymerized in a polymerization process such as a batch process or in a continuous process, which is performed in a single reactor or a reactor consisting of two or more reactors connected with each other.

[Conjugated Diene Compound]

The conjugated diene compound is not particularly limited, as long as it is a polymerizable monomer. Examples thereof include 1,3-butadiene, isoprene, 2,3-dimethyl-1,3-butadiene, 1,3-pentadiene, 3-methyl-1,3-pentadiene, 1,3-heptadiene and 1,3-hexadiene.

Among them, 1,3-butadiene and isoprene are preferable from the viewpoint of industrial availability. These may be used alone or in combination of two or more.

If an allen, an acetylene and the like are contained as impurities in a conjugated diene compound to be used in a polymerization step, a modification reaction (described later) may be inhibited. Thus, the total concentration (by mass) of these impurities contained is preferably 200 ppm or less, more preferably 100 ppm or less and further preferably 50 ppm or less. Examples of the allene include propadiene and 1,2-butadiene. Examples of the acetylene include ethyl acetylene and vinyl acetylene.

[Aromatic Vinyl Compound]

The aromatic vinyl compound is not particularly limited as long as it is a monomer copolymerizable with a conjugated diene compound. Examples thereof include styrene, p-methylstyrene, α-methylstyrene, vinylethylbenzene, vinylxylene, vinylnaphthalene and diphenylethylene.

Of them, styrene is preferable from the viewpoint of industrial availability. These may be used alone or in combination with two or more.

[Multifunctional Aromatic Vinyl Compound]

In the step of polymerizing a conjugated diene-based polymer before modification, a multifunctional aromatic vinyl compound may be used simultaneously with a conjugated diene compound and an aromatic vinyl compound or in the middle of polymerization. Owing to this, the branching degree of a molecular chain can be controlled and cold flow can be prevented.

As the multifunctional aromatic vinyl compound, e.g., divinyl benzene is mentioned.

[Solvent]

A polymerization reaction of a conjugated diene-based polymer is preferably performed in a solvent.

Examples of the solvent include, but not limited to, solvents of a hydrocarbon such as a saturated hydrocarbon and an aromatic hydrocarbon. Specific examples thereof include aliphatic hydrocarbons such as butane, pentane, hexane and heptane; alicyclic hydrocarbons such as cyclopentane, cyclohexane, methylcyclopentane and methylcyclohexane; aromatic hydrocarbons such as benzene, toluene and xylene; and a hydrocarbon consisting of a mixture of these.

[Treatment of Impurities in Raw Material]

The conjugated diene compound, aromatic vinyl compound, and polymerization solvent as mentioned above can be subjected, each independently or as a solution mixture of them, to a treatment for inactivating impurities such as an allen and an acetylene by reacting them with an organic metal compound, in advance of a polymerization reaction. Owing to the treatment, inhibition of polymerization with the impurities can be prevented and a large number of active ends of polymers are obtained. As a result, a sharper molecular weight distribution of the polymer can be attained and a high modification ratio tends to be obtained. For this reason, the treatment (removal) of impurities is preferable.

[Polar Compound]

In the polymerization reaction of a conjugated diene-based polymer, a polar compound may be added.

Random copolymerization of an aromatic vinyl compound and a conjugated diene compound can be made in the presence of the polar compound, which can also be used as a vinylation agent for controlling a microstructure of a conjugated diene moiety as well as is effective in improving e.g., a polymerization reaction.

Examples of the polar compound include, but not particularly limited to, ethers such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene and 2,2-bis(2-oxoranyl)propane; tertiary amine compounds such as tetramethylethylenediamine, dipiperidinoethane, trimethylamine, triethylamine, pyridine and quinuclidine; alkali metal alkoxide compounds such as potassium-tert-amylate, potassium-tert-butyrate, sodium-tert-butyrate and sodium amylate; and phosphine compounds such as triphenylphosphine.

These polar compounds may be used alone or in combination of two or more.

The amount of polar compound to be used is not particularly limited and can be selected depending upon the purpose and the like. The amount to be used based on 1 mole of a polymerization initiator is usually preferably 0.01 to 100 moles.

Such a polar compound (vinylation agent) can be used in an appropriate amount as a regulator for a microstructure of a conjugated diene moiety of a polymer depending upon a desired amount of vinyl likage. Many polar compounds also have a randomizing effect effective in copolymerization of a conjugated diene compound and an aromatic vinyl compound, and can be used for adjusting distribution of an aromatic vinyl compound and used as an agent for adjusting the amount of styrene block. As a method for randomizing a conjugated diene compound and an aromatic vinyl compound, for example, a method of intermittently adding 1,3-butadiene in portions during copolymerization as described in Japanese Patent Laid-Open No. S59-140211 may be used.

[Polymerization Temperature]

The polymerization temperature is not particularly limited as long as a living anion polymerization proceeds at the temperature. From the viewpoint of productivity, the polymerization temperature is preferably 0° C. or more. From the viewpoint of ensuring the amount of modifier to be reacted with an active end after completion of the polymerization, the polymerization temperature is preferably 120° C. or less.

<Polymerization Form of Conjugated Diene-Based Polymer>

In the embodiment, it is preferable to obtain a conjugated diene-based polymer through the growth by an anion polymerization reaction by use of the organic lithium compound represented by the above formula (7) or (8) and having at least one nitrogen atom in a molecule as a polymerization initiator. Particularly, it is more preferable that a conjugated diene-based polymer is a polymer having an active end obtained through a growth reaction by living anion polymerization. Owing to this, a modified conjugated diene-based polymer having a high modification ratio can be obtained.

<Hydrogenation>

The conjugated diene-based polymer obtained in the aforementioned polymerization step can be further hydrogenated in an inactive solvent to thereby convert all or some of double bonds to saturated hydrocarbons. In this case, heat resistance and weather resistance are improved, and deterioration of a product in the case of processing at a high temperature can be prevented. As a result, the modified conjugated diene-based polymer can deliver further excellent performance in various uses including automobile use.

More specifically, the rate of hydrogenation of unsaturated double bonds (i.e., "hydrogenation rate") derived from a conjugated diene compound can be arbitrarily chosen depending upon the purpose and is not particularly limited.

When a modified conjugated diene-based polymer is used as a vulcanized rubber, it is preferable that the double bonds of the conjugated diene moiety partially remain. From the viewpoint of this, the hydrogenation rate of the conjugated diene moiety of a polymer is preferably 3 to 70%, more preferably 5 to 65% and further preferably 10 to 60%.

Note that, in a copolymer of a conjugated diene compound and an aromatic vinyl compound, the hydrogenation rate of an aromatic double bond derived from the aromatic vinyl compound, is not particularly limited. The hydrogenation rate is preferably 50% or less, more preferably 30% or less and further preferably 20% or less. The hydrogenation rate can be obtained by a nuclear magnetic resonance apparatus (NMR).

The hydrogenation method is not particularly limited, and a known method can be used.

Examples of a particularly suitable hydrogenation method include a method of blowing gaseous hydrogen into a polymer solution in the presence of a catalyst.

Examples of the catalyst include a heterogeneous catalyst having a noble metal supported on a porous inorganic substance; and a homogeneous catalyst such as a catalyst obtained by solubilizing a salt of e.g., nickel and cobalt and reacting with e.g., organic aluminum, and a catalyst using a metallocene such as titanocene. Of them, a titanocene catalyst is particularly preferable since mild hydrogenation conditions can be selected. Furthermore, an aromatic group can be hydrogenated by use of a catalyst having a noble metal supported thereon.

Specific examples of the hydrogenation catalyst include (1) supported type heterogeneous hydrogenation catalysts having a metal such as Ni, Pt, Pd and Ru supported on carbon, silica, alumina, diatomaceous earth or the like; (2) so-called Ziegler type hydrogenation catalysts in which a salt of an organic acid of Ni, Co, Fe and Cr or a transition metal salt such as an acetyl acetone salt and a reducing agent such as organic aluminum are used; and (3) so-called organic metal complexes such as organic metal compounds of Ti, Ru, Rh and Zr. Hydrogenation catalysts as described, for example, in Japanese Patent Publication Nos. 42-8704, 43-6636, 63-4841, 1-37970, 1-53851 and 2-9041 and Japanese Patent Laid-Open No. 8-109219 can be used. Examples of a preferable hydrogenation catalyst include a reaction mixture of a titanocene compound and a reducible organic metal compound.

<Microstructure of Conjugated Diene-Based Polymer and Properties Thereof>

[Amount of Bound Conjugated Diene]

The amount of bound conjugated diene in the conjugated diene-based polymer obtained in the polymerization step is not particularly limited. The amount is preferably 50 to 100 mass % and more preferably 60 to 80 mass %.

[Amount of Bound Aromatic Vinyl]

The amount of aromatic vinyl in the conjugated diene-based polymer obtained in the polymerization step is not particularly limited. It is preferably 0 to 50 mass % and more preferably 20 to 40 mass %.

If the amount of bound conjugated diene and the amount of aromatic vinyl fall within the above respective ranges, a vulcanizate having further excellent balance between low hysteresis loss property and wet skid resistance, and satisfactory abrasion resistance and break strength can be obtained.

Herein, the amount of aromatic vinyl can be determined by ultraviolet absorbance of a phenyl group. From the amount bound, the amount of bound conjugated diene can also be obtained. More specifically, measurement can be made by the method in accordance with Examples (described later).

[Amount of Vinyl Likage]

The amount of vinyl likage in a conjugated diene binding unit is not particularly limited. The amount of bonding is preferably 10 to 75 mole % and more preferably 25 to 65 mole %.

If the amount of vinyl likage falls within the above range, a vulcanizate having further excellent balance between low hysteresis loss properties and wet skid resistance and satisfactory abrasion resistance and break strength can be obtained.

Herein, when the modified conjugated diene-based polymer is a copolymer of butadiene and styrene, the amount of vinyl likage (amount of 1,2-likage) in a butadiene binding unit can be obtained by the Hampton's method (R. R. Hampton, Analytical Chemistry, 21, 923 (1949)).

[Polymer Structure]

The conjugated diene-based polymer may be a random copolymer and a block copolymer. Examples of the random copolymer include a butadiene-isoprene random copolymer, a butadiene-styrene random copolymer, an isoprene-styrene random copolymer and a butadiene-isoprene-styrene random copolymer.

Examples of the composition distribution of individual monomers in a copolymer chain include, but not particularly limited to, a complete random copolymer the composition of which is close to a statistically random composition and a tapered (gradient) random copolymer having a tapered composition distribution. In the case of the binding mode of a conjugated diene such as 1,4-likage and 1,2-likage, a composition distribution may be uniform or nonuniform.

Examples of the block copolymer include a diblock copolymer formed of two blocks, a triblock copolymer formed of three blocks and a tetrablock copolymer formed of four blocks. Assuming that a block consisting of an aromatic vinyl compound such as styrene is represented by, for example, "S", a block consisting of a conjugated diene compound such as butadiene or isoprene and/or a block consisting of a copolymer between an aromatic vinyl compound and a conjugated diene compound is represented by "B", block copolymers may be expressed as an S-B diblock copolymer, an S-B-S triblock copolymer and an S-B-S-B tetra block copolymer.

In the above formula, it is not always necessary that the boarder of blocks is distinctive. For example, when block B is a copolymer of an aromatic vinyl compound and a conjugated diene compound, the aromatic vinyl compound in block B may be distributed uniformly or distributed in a tapered manner. Furthermore, in block B, a plurality of moieties where an aromatic vinyl compound is uniformly distributed and/or a plurality of moieties where an aromatic vinyl compound is distributed in a tapered manner may be present together. Furthermore, a plurality of segments different in content of an aromatic vinyl compound may be present together in block B. when a plurality of block S and a plurality of block B are present in a copolymer, constitutions such as molecular weights and compositions of them may be the same or different.

[Glass Transition Temperature of Conjugated Diene-Based Polymer]

If microstructures (individual amounts bound in the above modified conjugated diene copolymer) fall within the above ranges and the glass transition temperature of the copolymer falls within the range of −45° C. to −15° C., a vulcanizate having further excellent balance between low hysteresis loss property and wet skid resistance can be obtained. The glass transition temperature can be obtained by recording a DSC curve while increasing the temperature within a predetermined range in accordance with ISO22768: 2006, and determining a peak top (Inflection point) of a DSC differential curve as a glass transition temperature.

[Aromatic Vinyl Chain of Conjugated Diene-Based Polymer]

If the conjugated diene-based polymer in the embodiment is a conjugated diene-aromatic vinyl copolymer, it is preferable that the number of blocks in which a chain is formed of 30 or more aromatic vinyl units, is low or zero. Specifically, when a copolymer is a butadiene-styrene copolymer, the polymer is decomposed to analyze the amount of a polystyrene insoluble in methanol by a known method, i.e., the Kolthoff's method (method described in I. M. KOLTHOFF, et al., J. Polym. Sci. 1, 429 (1946)). According to the known method, the proportion of a block consisting of 30 or more chains consisting of aromatic vinyl units is preferably 5 mass % or less and more preferably 3 mass % or less based on the total amount of the polymer.

(Modification Step)

In the modification step, a compound (modifier) represented by the following formula (6) is reacted with an active end of the conjugated diene-based polymer obtained in the polymerization step mentioned above to obtain a modified conjugated diene-based polymer.

[Formula 42]

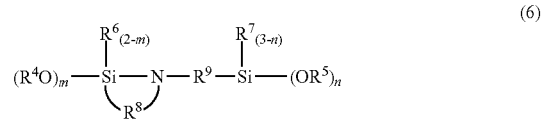

(6)

In the above formula (6), $R^4$ to $R^7$ each independently represent an alkyl group having 1 to 20 carbon atoms or an aryl group having 6 to 20 carbon atoms; $R^8$ represents an alkylene group having 3 to 10 carbon atoms; $R^9$ represents an alkylene group having 1 to 20 carbon atoms; m is an integer of 1 or 2; and n is an integer of 2 or 3.

In a compound (modifier) represented by the above formula (6), it is preferable that m is 2 and n is 3. Owning to this, the reactivity between the functional group of the modifier and an inorganic filler such as silica increases and the balance between fuel efficiency and wet grip performance of the resultant vulcanizate improves as well as processability improves.

Examples of the modifier represented by the above formula (6) include, but not limited to, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(5-trimethoxysilylpentyl)-1-aza-2-silacycloheptane, 2,2-dimethoxy-1-(3-dimethoxymethylsilylpropyl)-1-aza-2-silacyclopentane, 2,2-diethoxy-1-(3-diethoxyethylsilylpropyl)-1-aza-2-silacyclopentane, 2-methoxy, 2-methyl-1-(3-trimethoxysilylpropyl)-1-aza-2-silacyclopentane, 2-ethoxy, 2-ethyl-1-(3-triethoxysilylpropyl)-1-aza-2-silacyclopentane, 2-methoxy, 2-methyl-1-(3-dimethoxymethylsilylpropyl)-1-aza-2-silacyclopentane, and 2-ethoxy, 2-ethyl-1-(3-diethoxyethylsilylpropyl)-1-aza-2-silacyclopentane.

Of them, from the viewpoint of reactivity and interaction between a functional group of a modifier and an inorganic filler such as silica, and processability, a compound where m is 2 and n is 3 is preferable. Specifically, 2,2-dimethoxy-1-(3-trimethoxysilylpropyl)-1-aza-2-silacyclopentane and 2,2-diethoxy-1-(3-triethoxysilylpropyl)-1-aza-2-silacyclopentane are preferable.

The temperature and time of a reaction of the aforementioned modifier and an active end of a polymer are not particularly limited. The reaction is preferably performed at 0 to 120° C. for 30 seconds or more.

In the aforementioned modifier, it is preferable that the total mole number of alkoxy groups bound to silyl groups of a compound represented by the above formula (6) preferably falls within the range of 0.6 to 3 times as large as the mole number of lithium constituting a polymerization initiator as mentioned above, more preferably within the range of 0.8 to 2.5 times and further preferably within the range of 0.8 to 2 times.

In order for the modified conjugated diene-based polymer to obtain a sufficient modification ratio, the total number of moles is preferably 0.6 times or more. For improving processability, it is preferable that polymer ends are mutually coupled to obtain a branched polymer component. In considering this in combination with the cost of a modifier, the total number of moles is preferably 3 times or less.

In the method for producing a modified conjugated diene-based polymer according to the embodiment, after the aforementioned modification step is performed, if necessary, an inactivator, a neutralizer and the like may be added to a solution of the modified conjugated diene-based polymer.

Examples of the inactivator include, but not particularly limited to, water; alcohols such as methanol, ethanol and isopropanol.

Examples of the neutralizer include, but not particularly limited to, carboxylic acids such as stearic acid, oleic acid and versatic acid; an aqueous solution of inorganic acid; and carbonic acid gas.

(Desolvation Step)

As a method of obtaining a modified conjugated diene-based polymer according to the embodiment from a polymer solution, a known method can be used.

For example, a modified conjugated diene-based polymer is obtained by separating a solvent by e.g., steam stripping, obtaining the resultant polymer by filtration, and dehydrating and drying the polymer; or by concentrating a polymer solution in a flushing tank and vaporizing a solvent by e.g., a vent extruder or directly by e.g., a drum dryer.

[Modified Conjugated Diene-Based Polymer]
(Structure)

In the aforementioned modification step, it is sufficient if a modified conjugated diene-based polymer can be obtained by reacting an active end of the conjugated diene copolymer obtained in the polymerization step and a modifier represented by the above formula (6), and the function thereof can be estimated as follows.

For example, when an aza-silane compound having a cyclic structure such as 2,2-dimethoxy-1-(3-trimethoxysilyl-propyl)-1-aza-2-silacyclopentane is used as a modifier, an active end of a conjugated diene-based polymer is reacted with the alkoxysilyl group or a Si—N binding portion of the modifier to form a bond of a conjugated diene-based polymer end and Si (see, the following formula (10)).

For example, 4 moles of an active end of a conjugated diene-based polymer are reacted with the modifier (1 mole), modified conjugated diene-based polymers represented by the following formula (10), in which 4 molecular chains are coupled, can be obtained.

Furthermore, through a reaction with an alcohol, water or the like, a secondary amino group is formed. By use of a modified conjugated diene-based polymer having such a secondary amino group and an alkoxysilyl group, the resultant vulcanizate conceivably acquires excellent balance between low hysteresis loss property and wet skid resistance, sufficient abrasion resistance and break strength in practice, and excellent processability.

Note that the function of the embodiment is not limited to the aforementioned examples.

[Formula 43]

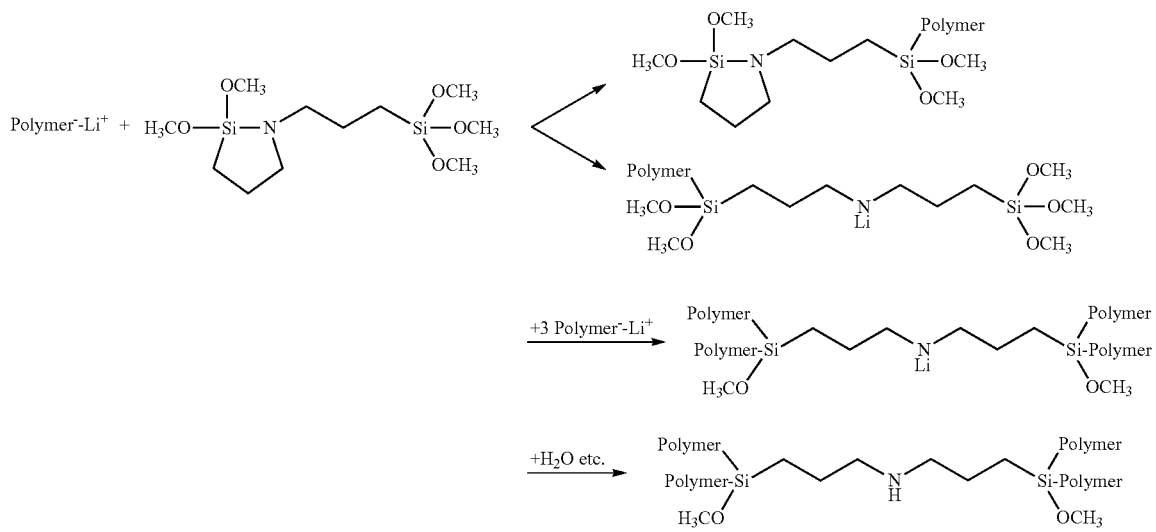

(10)

When the modified conjugated diene-based polymer obtained in the above modification step has a nitrogen atom containing functional group at a polymerization initiation end, when such a modified conjugated diene-based polymer is used, the resultant vulcanizate has excellent balance between fuel efficiency and wet skid resistance and excellent abrasion resistance and processability.

When the modified conjugated diene-based polymer obtained in the above modification step has a single secondary amino group and at least one alkoxysilyl group, when such a modified conjugated diene-based polymer is used, the resultant vulcanizate has excellent balance between low hysteresis loss property and wet skid resistance, sufficient abrasion resistance and break strength in practice, and excellent processability.

When the modified conjugated diene-based polymer obtained in the above modification step has 1 to 6 branched structures, the modified conjugated diene-based polymer and the composition of the modified conjugated diene-based polymer have excellent processability. From the viewpoint of this, the polymer more preferably has 1 to 4 branched structures.

<The Amount of Polymer Having a Functional Group Component (Modification Ratio)>

In the modification step, from the viewpoint of obtaining a vulcanizate having excellent balance between low hysteresis loss property and wet skid resistance and sufficient abrasion resistance and break strength in practice, a modified conjugated diene-based polymer is preferably produced such that the ratio (modification ratio) of a polymer having a functional group component (polymer having at least one of the ends modified) is preferably 50 mass % or more, more preferably 80 mass % or more, further preferably 90 mass % or more, and still further preferably 95 mass %.

The modification ratio of the modified conjugated diene-based polymer obtained by the method for producing a modified conjugated diene-based polymer according to the embodiment refers to the ratio of a polymer having a functional group component, which is obtained by the amount of adsorption on a column charged with silica particles and used in gel permeation chromatography (GPC) measurement. The timing at which a modification ratio is determined is after the modification step and after an active end is inactivated.

As a method for quantifying a polymer having a functional group component, a chromatographic method, by which a functional group-containing modified component can be separated from a non-modified component, can be applied. Examples of the method using the chromatography include a quantification method using a GPC column charged with a polar substance, such as silica adsorbing a functional group component, as a filler. In this method, quantification can be made by comparison based on a non-adsorbable component used as an internal standard.

<Molecular Weight of Modified Conjugated Diene-Based Polymer>

The molecular weight of the modified conjugated diene-based polymer according to the embodiment (weight average molecular weight: a polystyrene equivalent) is preferably 30,000 to 2,000,000 and more preferably 50,000 to 1,500,000 from the viewpoint of processability and performance such as tensile property of a modified conjugated diene-based polymer composition (described later).

The molecular weight distribution (weight average molecular weight/number average molecular weight) is preferably 1.0 to 3.0 and more preferably 1.1 to 2.0 from the viewpoint of processability and reducing hysteresis loss of a modified conjugated diene-based polymer composition (described later).

The weight average molecular weight can be obtained, for example, by obtaining a chromatogram by GPC using three columns charged with polystyrene gel as a filler and mutually connected, and computationally obtaining a molecular weight based on a calibration curve of standard polystyrene.

Specifically, measurement can be performed by using tetrahydrofuran (THF) as an eluent; and, as the columns, a guard column: TSK guard column HHR-H (manufactured by Tosoh Corporation), column: TSK gel G6000HHR, TSK gel G5000HHR, TSK gel G4000HHR (manufactured by Tosoh Corporation); in the conditions: an oven temperature of 40° C., a THF flow rate of 1.0 mL/minute, and by use of an RI detector (HLC8020 manufactured by Tosoh Corporation).

It is preferable that when a sample is a polymer having a narrow molecular weight distribution (1 or more and less than 1.8), 10 mg of the sample is dissolved in 20 mL of THF, whereas when a sample is a polymer having a broad molecular weight distribution (1.8 or more), 20 mg of the sample is dissolved in 20 mL of THF, and 20 µL is injected for measurement.

(Additives)
<Rubber Stabilizer>

It is preferable that a rubber stabilizer is added to a modified conjugated diene-based polymer according to the embodiment from the viewpoint of preventing generation of gel after polymerization and improving stability during processing.

The rubber stabilizer is not particularly limited and a known rubber stabilizer can be used. For example, antioxidants such as 2,6-di-tert-butyl-4-hydroxytoluene (BHT), n-octadecyl-3-(4'-hydroxy-3',5'-di-tert-butylphenol)propionate and 2-methyl-4,6-bis[(octylthio)methyl]phenol are preferable.

<Extender Oil>

To further improve processability of the modified conjugated diene-based polymer according to the embodiment, if necessary, extender oil may be added to the modified conjugated diene copolymer.

A method for adding extender oil to a modified conjugated diene-based polymer is not particularly limited. A method of adding extender oil to a polymer solution, mixing to obtain a solution of oil extended copolymer and removing a solvent is preferable.

Examples of the extender oil include, but not limited to, aroma oil, naphthene oil and paraffin oil. Of them, from the viewpoint of environmental safety, prevention of oil bleed, and wet grip property, an aroma substituted oil containing 3 mass % or less of a polycyclic aromatic (PCA) component extracted in accordance with Method IP346, is preferable.

Examples of the aroma oil substitute include TDAE (Treated Distillate Aromatic Extracts) and MES (Mild Extraction Solvate) shown in Kautschuk Gummi Kunststoffe 52 (12) 799 (1999) and RAE (Residual Aromatic Extracts).

The amount of extender oil to be added is not particularly limited. The amount to be added is usually 10 to 60 parts by mass based to 100 parts by mass of the modified conjugated diene-based polymer and preferably 20 to 37.5 parts by mass.

[Modified Conjugated Diene-Based Polymer Composition]

The modified conjugated diene-based polymer composition according to the embodiment contains 100 parts by mass of a rubber component containing 20 parts by mass or more of the modified conjugated diene-based polymer according to the embodiment as mentioned above and 0.5 to 300 parts by mass of a silica inorganic filler.

(Rubber Component)

As the rubber component, a rubber-like polymer other than the modified conjugated diene-based polymer according to the embodiment can be used in combination with the modified conjugated diene-based polymer according to the embodiment.

The rubber-like polymers other than the modified conjugated diene-based polymer according to the embodiment include, but not particularly limited to, conjugated diene-based polymers or hydrogenated products thereof, random copolymers of a conjugated diene compound and a vinyl aromatic compound or hydrogen additives thereof, block copolymers of a conjugated diene compound and a vinyl aromatic compound or hydrogen additives thereof, non-diene-based polymers and natural rubbers.

Specific examples thereof include butadiene rubbers or hydrogen additives thereof, isoprene rubbers or hydrogen additives thereof, styrene elastomers such as styrene-butadiene rubbers or hydrogen additives thereof, styrene-butadiene block copolymers or hydrogen additives thereof and styrene-isoprene block copolymers or hydrogen additive thereof, and acrylonitrile-butadiene rubbers or hydrogen additives thereof.

Examples of the non-diene-based polymers include olefin elastomers such as an ethylene-propylene rubber, an ethylene-propylene-diene rubber, an ethylene-butene-diene rubber, an ethylene-butene rubber, an ethylene-hexene rubber and an ethylene-octene rubber; butyl rubbers, brominated butyl rubbers, acryl rubbers, fluorine rubbers, silicone rubbers, chlorinated polyethylene rubbers, epichlorohydrin rubbers, α,β-unsaturated nitrile-acrylic acid ester-conjugated diene copolymer rubbers, urethane rubbers and polysulfide rubbers.

The aforementioned rubber-like polymers may be modified rubbers obtained by adding a functional group having a polarity, such as a hydroxy group and an amino group. The weight average molecular weight of each of the rubber-like polymers is preferably 2,000 to 2,000,000 and more preferably 5,000 to 1,500,000 from the viewpoint of the balance between performance and processability. Furthermore, a so-called liquid rubber having a low molecular weight can be used. These rubber-like polymers may be used alone or in combination of two or more.

If the rubber component contains the modified conjugated diene-based polymer according to the embodiment and a rubber-like polymer as mentioned above, the blending ratio (mass ratio) of these, i.e., the ratio of the modified conjugated diene-based polymer/rubber-like polymer, is preferably 20/80 to 100/0, more preferably 30/70 to 90/10 and further preferably 50/50 to 80/20. When the blending ratio of the modified conjugated diene-based polymer/rubber-like polymer falls within the above range, a vulcanizate having further excellent balance between low hysteresis loss properties and wet skid resistance and further satisfactory abrasion resistance and break strength can be obtained.

(Silica Inorganic Filler)

By dispersing a silica inorganic filler in the modified conjugated diene-based polymer according to the embodiment, the resultant vulcanizate acquires excellent balance between low hysteresis loss property and wet skid resistance, sufficient abrasion resistance and break strength in practice and excellent processability.

The silica inorganic filler is not particularly limited and a known silica inorganic filler can be used. A solid particle containing $SiO_2$ or $Si_3Al$ as a component is preferable and a solid particle containing $SiO_2$ or $Si_3Al$ as a main component is more preferable.

Herein, the main component refers to a component contained in a silica inorganic filler in an amount of 50 mass % or more, preferably 70 mass % or more and more preferably 80 mass % or more.

Examples of the silica inorganic filler include, but not limited to, silica, clay, talc, mica, diatomaceous earth, wollastonite, montmorillonite, zeolite and inorganic fibrous substances such as glass fiber.

Furthermore, a surface-hydrophobized silica inorganic filler and a mixture of a silica inorganic filler and an inorganic filler other than the silica inorganic filler can be used.

Of them, from the viewpoint of e.g., strength and abrasion resistance, silica and glass fiber are preferable and silica is more preferable.

Examples of the silica include dry silica, wet silica and synthesized silicate silica. Of them, from the viewpoint of excellent balance between an effect of improving breaking properties and wet skid resistance, wet silica is preferable. From the viewpoint of obtaining good abrasion resistance and breaking properties in practice in a modified conjugated diene-based polymer composition, the nitrogen adsorption specific surface area of silica inorganic filler obtained by BET adsorption method is preferably 100 to 300 $m^2/g$ and more preferably 170 to 250 $m^2/g$.

Furthermore, if necessary, a silica inorganic filler having a relatively small specific surface area (for example, specific surface area is 200 $m^2/g$ or less) can be used in combination with a silica inorganic filler having a relatively large specific surface area (for example, 200 $m^2/g$ or more). By virtue of this, good abrasion resistance and break strength can be highly balanced with low hysteresis loss properties.

As described above, the content of a silica inorganic filler in the modified conjugated diene-based polymer composition based on 100 parts by mass of the rubber component containing a modified conjugated diene-based polymer according to the embodiment is 0.5 to 300 parts by mass, preferably 5 to 200 parts by mass and more preferably 20 to 100 parts by mass.

The content of a silica inorganic filler is 0.5 parts by mass or more from the viewpoint of exerting an addition effect of the inorganic filler, and 300 parts by mass or less from the viewpoint of sufficiently dispersing an inorganic filler and obtaining practically sufficient processability and mechanical strength of the composition.

(Carbon Black)

To the modified conjugated diene-based polymer composition according to the embodiment, carbon black may be added.

Examples of the carbon black that can be used include, but not particularly limited to, classes of carbon blacks such as SRF, FEF, HAF, ISAF and SAF. Of them, carbon black having a nitrogen adsorption specific surface area of 50 $m^2/g$ or more and an amount of dibutylphthalate (DBP) oil absorption of 80 mL/100 g, is preferable.

The content of carbon black based on 100 parts by mass of the rubber component containing a modified conjugated diene-based polymer according to the embodiment is preferably 0.5 to 100 parts by mass, more preferably 3 to 100 parts by mass and further preferably 5 to 50 parts by mass. The amount of carbon black to be blended is preferably 0.5 parts by mass or more from the viewpoint of delivering performance required for use in, e.g., tire such as dry grip performance and conductivity, and preferably 100 parts by mass or less from the viewpoint of dispersibility.

(Metal Oxide and Metal Hydroxide)

To the modified conjugated diene-based polymer composition according to the embodiment, a metal oxide and a metal hydroxide may be added in addition to a silica inorganic filler and carbon black mentioned above.

The metal oxide refers to solid particles containing a substance represented by chemical formula $M_xO_y$, where M represents a metal atom, and x and y each represent an integer of 1 to 6 as a main component of a constitutional unit, but is not particularly limited. For example, alumina, titanium oxide, magnesium oxide and zinc oxide can be used. Furthermore, a mixture of a metal oxide and an inorganic filler other than the metal oxide can be used.

Examples of the metal hydroxide include, but not particularly limited to, aluminum hydroxide, magnesium hydroxide and zirconium hydroxide.

(Silane Coupling Agent)

To the modified conjugated diene-based polymer composition according to the embodiment, a silane coupling agent may be added.

The silane coupling agent has a function of facilitating the interaction between a rubber component and a silica inorganic filler and has a group having affinity or binding ability to each of the rubber component and the silica inorganic filler. Generally, a compound having a sulfur binding moiety, an alkoxysilyl group and silanol group moiety in a molecule is used. Specific examples thereof include bis-[3-(triethoxysilyl)-propyl]-tetrasulfide, bis-[3-(triethoxysilyl)-propyl]-disulfide and bis-[2-(triethoxysilyl)-ethyl]-tetrasulfide.

The content of the silane coupling agent based on 100 parts by mass of the aforementioned silica inorganic filler is preferably 0.1 to 30 parts by mass, more preferably 0.5 to 20 parts by mass and further preferably 1 to 15 parts by mass. When the amount of silane coupling agent to be blended falls within the above range, the addition effect of the silane coupling agent can be exerted further significantly.

(Rubber Softener)

To the modified conjugated diene-based polymer composition according to the embodiment, a rubber softener may be added from the viewpoint of improving processability.

As the rubber softener, mineral oil or liquid or low molecular weight synthetic softener is suitable.

The mineral-oil rubber softener may contain oil called process oil or extender oil, which is used for softening rubber, increasing volume of rubber and improving processability of rubber. Among the mineral-oil rubber softener which is a mixture of an aromatic ring, a naphthene ring and a paraffin chain, a softener in which the carbon atoms of the paraffin chain occupy 50% or more of the total carbon atoms is called a paraffin rubber softener; a softener in which the carbon atoms of the naphthene ring occupy 30 to 45% of the total carbon atoms is called a naphthene rubber softener; and a softener in which the aromatic carbon atoms occupy more than 30% of the total carbon atoms is called an aromatic rubber softener.

As the rubber softener to be used in the modified conjugated diene-based polymer composition according to the embodiment, an aroma substituted oil containing 3 mass % or less of a polycyclic aromatic (PCA) component extracted in accordance with Method IP346 is preferable from the viewpoint of environmental safety, prevention of oil bleed and wet grip property.

The content of rubber softener based on 100 parts by mass of the rubber component containing a modified conjugated diene-based polymer is preferably 0 to 100 parts by mass, more preferably 10 to 90 parts by mass and further preferably 30 to 90 parts by mass. When the content of a rubber softener based on 100 parts by mass of the rubber component exceeds 100 parts by mass, bleed out tends to occur and the surface of the composition may be sticky.

(Other Additives)

To the modified conjugated diene-based polymer composition according to the embodiment, other softeners and fillers other than the aforementioned and further various additives such as a heat resistance stabilizer, an antistatic agent, a weather resistant stabilizer, an age resister, a colorant and a lubricant may be added. As the other softeners, known softeners can be used.

Specific examples of the other fillers include calcium carbonate, magnesium carbonate, aluminum sulfate and barium sulfate.

As each of the above heat resistant stabilizer, antistatic agent, weather resistant stabilizer, age resister, colorant and lubricant, known materials can be used.

(Method for Producing Modified Conjugated Diene-Based Polymer Composition)

The method for producing the modified conjugated diene-based polymer composition according to the embodiment is not particularly limited. For example, the aforementioned rubber component, a silica inorganic filler and other materials mentioned above as needed are melted and kneaded by use of a general kneader such as an open roll, a Banbury mixer, a kneader, a single screw extruder, a double screw extruder and a multi screw extruder. In addition to this method, examples include a method in which individual components are dissolved and mixed and then a solvent is removed by heating.

Of them, the melting and kneading method using a roll, a Banbury mixer, a kneader or an extruder is preferable from the viewpoint of productivity and good kneading properties.

A modified conjugated diene-based polymer and various materials may be simultaneously kneaded or separately added in multiple portions. Both methods can be applied.

(Vulcanizing Agent)

The modified conjugated diene-based polymer composition according to the embodiment can be suitably used as a vulcanizate.

The vulcanizate can be obtained by mixing a modified conjugated diene-based polymer with e.g., an inorganic filler such as a silica inorganic filler, and if necessary, carbon black, a rubber-like polymer other than a modified conjugated diene-based polymer, a silane coupling agent, a rubber softener, a vulcanizing agent and a vulcanizing accelerator/auxiliary agent, heating and vulcanizing the mixture.

Examples of the vulcanizing agent that can be used include a radical generator such as an organic peroxide and an azo compound, an oxime compound, a nitroso compound, a polyamine compound, sulfur and a sulfur compound. Examples of the sulfur compound include sulfur monochloride, sulfur dichloride, a disulfide compound and a high-molecular weight polysulfide compound.

The content of vulcanizing agent based on 100 parts by mass of the rubber component containing a modified conjugated diene-based polymer according to the embodiment is usually 0.01 to 20 parts by mass and preferably 0.1 to 15 parts by mass. As a vulcanization method, a conventionally known method can be applied. The vulcanization temperature is usually 120 to 200° C. and preferably 140 to 180° C.

As a vulcanizing accelerator, a conventionally known material can be used. Examples of the vulcanizing accelerator include a sulfenamide agent, a guanidine agent, a thiuram agent, an aldehyde-amine agent, an aldehyde-ammonia agent, a thiazole agent, a thiourea agent and a dithiocarbamate agent.

The content of vulcanizing accelerator based on 100 parts by mass of the rubber component containing a modified conjugated diene-based polymer according to the embodiment is usually 0.01 to 20 parts by mass and preferably 0.1 to 15 parts by mass.

As a vulcanizing auxiliary agent, e.g., zinc oxide and stearic acid can be used.

[Rubber Composition Obtained by Crosslinking Modified Conjugated Diene-Based Polymer Composition]

The modified conjugated diene-based polymer composition described above are each crosslinked by adding e.g., a vulcanizing agent and various compound agents to prepare a rubber composition, which can be used in producing desired rubber products.

[Tire and the Like]

Rubber compositions obtained by crosslinking the modified conjugated diene-based polymer composition mentioned above can be used in tire, vibration-proof rubber and various industrial products.

EXAMPLES

The present invention will be more specifically described by way of the following Examples; however, the present invention is not limited by the following Examples in any way. Note that, samples were analyzed by the following methods.

(1) Amount of Bound Styrene

A sample (100 mg) of a modified conjugated diene-based polymer obtained in each of Examples and Comparative Examples (described later) was diluted in chloroform in a measuring cylinder to 100 mL and dissolved to obtain a measuring sample.

The amount (mass %) of bound styrene was determined by measuring absorption of a phenyl group of styrene at UV 254 nm by use of a spectrophotometer "UV-2450" (manufactured by Shimadzu Corporation).

(2) Microstructure of Butadiene Moiety (Amount of 1,2-Vinyl Likage)

A sample (50 mg) of a modified conjugated diene-based polymer obtained in each of Examples and Comparative Examples (described later) was dissolved in 10 mL of carbon disulfide to prepare a measurement sample.

Using a solution cell, an infrared spectrum was measured in the range of 600 to 1000 $cm^{-1}$ by use of FT-IR230 (manufactured by JASCO Corporation) as a measurement apparatus. Based on the absorbance at a predetermined wave number, the microstructure (amount of 1,2-vinyl likage (mol %)) of the butadiene moiety was obtained in accordance with the computational expression of the Hampton's method.

(3) Mooney Viscosity of Modified Conjugated Diene-Based Polymer

Mooney viscosity of a modified conjugated diene-based polymer obtained in each of Examples and Comparative Examples (described later) was measured as follows.

Mooney viscosity was measured by a Mooney viscometer ("VR1132" manufactured by Ueshima Seisakusho Co., Ltd.) in accordance with JIS K6300 (ISO289-1). The measurement temperature was set at 100° C. First, a sample was preheated for one minute and a rotor was rotated at 2 rpm. Four minutes later, torque was measured to obtain Mooney viscosity ($ML_{1+4}$).

(4) Modification Ratio

The modification ratio of a modified conjugated diene-based polymer obtained in each of Examples and Comparative Examples (described later) was determined by use of the property of a modified component for adsorbing to a GPC column charged with a silica gel as a filler.

The modification ratio herein refers to the ratio of a polymer at least one of the ends of which is modified.

A sample solution containing a sample of a modified conjugated diene-based polymer obtained in each of Examples and Comparative Examples (described later) and low molecular weight internal standard polystyrene was measured by a polystyrene gel column to obtain a chromatogram and measured by a silica column to obtain a chromatogram. Based on the difference between the two columns, the amount of adsorption on the silica column was determined to obtain a modification ratio.

Preparation of Sample:

10 mg of a sample and 5 mg of standard polystyrene were dissolved in 20 mL of tetrahydrofuran (THF).

GPC Measurement Conditions Using a Polystyrene Column:

Measurement was performed by using THF as an eluent and injecting 200 μL of a sample into the apparatus. As the columns, a guard column: TSK guard column HHR-H manufactured by Tosoh Corporation, and columns: TSKgel G6000HHR, TSKgel G5000HHR and TSKgel G4000HHR manufactured by Tosoh Corporation were used. Measurement was performed under the conditions: a column oven temperature of 40° C. and a THF flow rate of 1.0 mL/minute, by using an RI detector of HLC8020 manufactured by Tosoh Corporation to obtain a chromatogram.

GPC Measurement Conditions Using a Silica Column:

Measurement was performed by using THF as an eluent and injecting 200 μL of a sample into the apparatus. As the column, Zorbax manufactured by Du Pont Kabushiki Kaisha was used. Under the conditions: column oven temperature of 40° C. and a THF flow rate of 0.5 mL/minute, measurement was performed by RI detector of HLC8020 manufactured by Tosoh Corporation to obtain a chromatogram.

Calculation Method of Modification Ratio:

Assuming that the total peak area of a chromatogram using a polystyrene column was 100, the peak area of a sample was represented by P1, the peak area of standard polystyrene was represented by P2; and assuming that the total peak area of a chromatogram using a silica column was 100, the area of a sample was represented by P3, the peak area of standard polystyrene was represented by P4, a modification ratio (%) was obtained by the following equation:

$$\text{Modification ratio}(\%)=[1-(P2\times P3)/(P1\times P4)]\times 100$$

(Note that P1+P2=P3+P4=100.)

Example 1

A temperature controllable autoclave having an inner volume of 10 L and equipped with a stirrer and a jacket was used as a reactor. In the reactor, 762 g of 1,3-butadiene, 268 g of styrene, 4710 g of cyclohexane and 1.3 g of 2,2-bis(2-oxolanyl)propane serving as a polar substance, from which impurities were previously removed, were placed and the interior temperature of the reactor was maintained at 42° C.

As a polymerization initiator, dibutylamine (13.0 mmol) and n-butyllithium (13.0 mmol) were previously reacted in the presence of tetrahydrofuran (26.0 mmol) to obtain dibutylamino lithium. A cyclohexane solution of dibutylamino lithium (13.0 mmol) was supplied to the reactor.

After initiation of a polymerization reaction, the interior temperature of the reactor started increasing by heat generation due to polymerization and the final interior temperature of the reactor reached 80° C.

Two minutes after the reaction temperature reached the peak, 3.25 mmol of 2,2-dimethoxy-1-(3-trimethoxysilylpropyl)-1-aza-2-silacyclopentane was added to the reactor, and a modification reaction was carried out for 5 minutes.

To the polymer solution, 2.1 g of an antioxidant (2,6-di-tert-butyl-4-hydroxytoluene; BHT) was added, and thereafter the solvent was removed by steam tripping and drying treatment was applied by a dryer to obtain a modified conjugated diene-based polymer (sample A).

As a result of analysis of sample A, the amount of bound styrene was 26 mass % and amount of bound butadiene was 74 mass %. The Mooney viscosity at 100° C. was 58. The amount of vinyl likage (amount of 1,2-likage) in the microstructure of a butadiene moiety, obtained by calculation in accordance with the Hampton's method based on the measurement results by use of an infrared spectrophotometer was 55 mol %. Furthermore, the modification ratio was 98%. The analysis results of sample A were shown in Table 1.

Example 2

A temperature controllable autoclave (inner volume 10 L) equipped with a stirrer and a jacket was used as a reactor. In the reactor, 1,3-butadiene (762 g), styrene (268 g), cyclohexane (4710 g) and 2,2-bis(2-oxoranyl)propane (1.45 g) as a polar substance, from which impurities were previously removed, were placed and the interior temperature of the reactor was kept at 42° C.

As a polymerization initiator, hexamethyleneimine (13.0 mmol) and n-butyllithium (13.0 mmol) were previously reacted to obtain hexamethyleneiminolithium. A cyclohexane solution of hexamethyleneiminolithium (13.0 mmol) was supplied to the reactor.

After initiation of the polymerization reaction, the interior temperature of the reactor started increasing by heat generation due to polymerization and the final interior temperature of the reactor reached 78° C. Two minutes after the reaction temperature reached the peak, 2,2-dimethoxy-1-(3-trimethoxysilylpropyl)-1-aza-2-silacyclopentane (3.25 mmol) was added to the reactor, and a modification reaction was carried out for 5 minutes.

To the polymer solution, 2.1 g of an antioxidant (2,6-di-tert-butyl-4-hydroxytoluene; BHT) was added, and thereafter the solvent was removed by steam stripping and dry treatment was applied by a dryer to obtain a modified conjugated diene-based polymer (sample B).

As a result of analysis of sample B, the amount of bound styrene was 26 mass % and amount of bound butadiene was 74 mass %. The Mooney viscosity at 100° C. was 57. The amount of vinyl likage (amount of 1,2-likage) in the microstructure of a butadiene moiety, obtained by calculation in accordance with the Hampton's method based on the measurement results by use of an infrared spectrophotometer was 56 mol %. Furthermore, the modification ratio was 99%. The analysis results of sample B were shown in Table 1.

Example 3

To a mixture of dibutyl amine (13.3 mmol), tetrahydrofuran (26.6 mmol) and hexane, n-butyllithium (13.3 mmol) was added at room temperature to prepare dibutylaminolithium. A hexane solution of the lithium amide was cooled to −25° C. and 1-chloro-3-bromopropane (13.3 mmol) was added to this. The temperature of the mixture was raised to 0° C. while stirring the mixture over one hour. After the mixture was again cooled to −25° C., a pentane solution of t-butyllithium (26.6 mmol) was added to obtain a mixture of (3-(dibutylamino)-propyl)lithium. The mixture was stirred as it was up to room temperature and stirred overnight.

Using this mixture, polymerization of a modified conjugated diene-based polymer (sample C) was performed.

A temperature controllable autoclave (inner volume 10 L) equipped with a stirrer and a jacket was used as a reactor. In the reactor, 1,3-butadiene (762 g), styrene (268 g), cyclohexane (4710 g) and 2,2-bis(2-oxoranyl)propane (1.30 g) as a polar substance, from which impurities were previously removed, were placed and the interior temperature of the reactor was kept at 42° C.

As a polymerization initiator, a hexane solution of (3-(dibutylamino)-propyl)lithium (13.3 mmol) was supplied to the reactor. After initiation of the polymerization reaction, the interior temperature of the reactor started increasing by heat generation due to polymerization and the final interior temperature of the reactor reached 83° C. Two minutes after the reaction temperature reached the peak, 2,2-dimethoxy-1-(3-trimethoxysilylpropyl)-1-aza-2-silacyclopentane (3.33 mmol) was added to the reactor, and a modification reaction was carried out for 5 minutes.

To the polymer solution, 2.1 g of an antioxidant (2,6-di-tert-butyl-4-hydroxytoluene; BHT) was added, and thereafter the solvent was removed by steam stripping and dry treatment was applied by a dryer to obtain a modified conjugated diene-based polymer (sample C).

As a result of analysis of sample C, the amount of bound styrene was 26 mass % and the amount of bound butadiene was 74 mass %. The Mooney viscosity at 100° C. was 62. The amount of vinyl likage (amount of 1,2-likage) in the microstructure of a butadiene moiety, obtained by calculation in accordance with the Hampton's method based on the measurement results by use of an infrared spectrophotometer was 55 mol %. Furthermore, the modification ratio was 99%. The analysis results of sample C were shown in Table 1.

Example 4

To a mixture of hexamethyleneimine (13.2 mmol), tetrahydrofuran (26.4 mmol) and hexane, n-butyllithium (13.2 mmol) was added at room temperature to prepare hexamethyleneiminolithium. A hexane solution of the lithium amide was cooled to −25° C. and 1-chloro-3-bromopropane (13.2 mmol) was added to this. The temperature of the mixture was raised to 0° C. while stirring the mixture over one hour. After the mixture was again cooled to −25° C., a pentane solution of t-butyllithium (26.4 mmol) was added to obtain a mixture of (3-(hexamethyleneiminyl)propyl)lithium. The mixture was stirred as it was up to room temperature and stirred overnight.

Using this mixture, polymerization of a modified conjugated diene-based polymer (sample D) was performed.

A temperature controllable autoclave (inner volume 10 L) equipped with a stirrer and a jacket was used as a reactor. In the reactor, 1,3-butadiene (762 g), styrene (268 g), cyclohexane (4710 g) and 2,2-bis(2-oxoranyl)propane (1.30 g) as a polar substance, from which impurities were previously removed, were placed and the interior temperature of the reactor was kept at 42° C. As a polymerization initiator, a hexane solution of (3-(hexamethyleneiminyl)propyl)lithium (13.2 mmol) was supplied to the reactor. After initiation of the polymerization reaction, the interior temperature of the reactor started increasing by heat generation due to polymerization and the final interior temperature of the reactor reached 84° C. Two minutes after the reaction temperature reached the peak, 2,2-dimethoxy-1-(3-trimethoxysilylpropyl)-1-aza-2-silacyclopentane (3.30 mmol) was added to the reactor, and a modification reaction was carried out for 5 minutes.

To the polymer solution, 2.1 g of an antioxidant (2,6-di-tert-butyl-4-hydroxytoluene; BHT) was added, and thereafter the solvent was removed by steam stripping and dry treatment was applied by a dryer to obtain a modified conjugated diene-based polymer (sample D).

As a result of analysis of sample D, the amount of bound styrene was 26 mass % and the amount of bound butadiene was 74 mass %. The Mooney viscosity at 100° C. was 59. The amount of vinyl likage (amount of 1,2-likage) in the microstructure of a butadiene moiety, obtained by calculation in accordance with the Hampton's method based on the measurement results by use of an infrared spectrophotometer was 55 mol %. Furthermore, the modification ratio was 99%. The analysis results of sample D were shown in Table 1.

Example 5

A mixture consisting of dibutyl amine (0.5 mol), cyclohexane and n-butyllithium (0.25 mol) was placed in an airtight container and stirred at room temperature for 4 hours. Subsequently, to this mixture, 1,3-butadiene (0.34 mol) was added and stirred at 50° C. overnight. The content of the bottle was treated with 10 mL of ethanol and then concentrated by distillation. Vacuum distillation was performed at 133 Pa and the final two fractions, i.e., a component at 125 to 145° C. and a component at 135 to 155° C. were collected.

The above fraction (2.45 g) and n-butyllithium (13.4 mol) were reacted by stirring them in the presence of tetrahydrofuran (26.8 mol) in cyclohexane overnight to obtain (4-(dibutylamino)-2-butenyl)lithium.

A temperature controllable autoclave (inner volume 10 L) equipped with a stirrer and a jacket was used as a reactor. In the reactor, 1,3-butadiene (762 g), styrene (268 g), cyclohexane (4710 g) and 2,2-bis(2-oxoranyl)propane (1.30 g) as a polar substance, from which impurities were previously removed, were placed and the interior temperature of the reactor was kept at 42° C.

As a polymerization initiator, a cyclohexane solution of (4-(dibutylamino)-2-butenyl)lithium (13.4 mmol) was supplied to the reactor. After initiation of a polymerization reaction, the interior temperature of the reactor started increasing by heat generation due to polymerization and the final interior temperature of the reactor reached 84° C. Two minutes after the reaction temperature reached the peak, 3.35 mmol of 2,2-dimethoxy-1-(3-trimethoxysilylpropyl)-1-aza-2-silacyclopentane was added to the reactor and a modification reaction was carried out for 5 minutes.

To the polymer solution, 2.1 g of an antioxidant (2,6-di-tert-butyl-4-hydroxytoluene; BHT) was added, and thereafter the solvent was removed by steam stripping and dry treatment was applied by a dryer to obtain a modified conjugated diene-based polymer (sample E).

As a result of analysis of sample E, the amount of bound styrene was 26 mass % and the amount of bound butadiene was 74 mass %. The Mooney viscosity at 100° C. was 63. The amount of vinyl likage (amount of 1,2-likage) in the microstructure of a butadiene moiety, obtained by calculation in accordance with the Hampton's method based on the measurement results by use of an infrared spectrophotometer was 55%. Furthermore, the modification ratio was 98%. The analysis results of sample E were shown in Table 1.

Example 6

A mixture consisting of hexamethyleneimine (0.5 mol), cyclohexane and n-butyllithium (0.25 mol) was placed in an airtight container and stirred at room temperature for 4 hours. Subsequently, to this mixture, 1,3-butadiene (0.34 mol) was added and stirred at 50° C. overnight. The content of the bottle was treated with 10 mL of ethanol and then concentrated by distillation. Vacuum distillation was performed at 133 Pa and the final two fractions, i.e., a component at 110 to 130° C. and a component at 120 to 140° C. were collected.

The above fraction (2.02 g) and n-butyllithium (13.3 mol) were reacted by stirring them in the presence of tetrahydrofuran (26.6 mol) in cyclohexane overnight to obtain (4-(hexamethyleneiminyl)-2-butenyl)lithium.

A temperature controllable autoclave (inner volume 10 L) equipped with a stirrer and a jacket was used as a reactor. In the reactor, 1,3-butadiene (762 g), styrene (268 g), cyclohexane (4710 g) and 2,2-bis(2-oxoranyl)propane (1.30 g) as a polar substance, from which impurities were previously removed, were placed and the interior temperature of the reactor was kept at 42° C.

As a polymerization initiator, a cyclohexane solution of (4-(hexamethyleneiminyl)-2-butenyl)lithium (13.3 mmol) was supplied to the reactor. After initiation of the polymerization reaction, the interior temperature of the reactor started increasing by heat generation due to polymerization and the final interior temperature of the reactor reached 85° C. Two minutes after the reaction temperature reached the peak, 2,2-dimethoxy-1-(3-trimethoxysilylpropyl)-1-aza-2-silacyclopentane (3.33 mmol) was added to the reactor, and a modification reaction was carried out for 5 minutes.

To the polymer solution, 2.1 g of an antioxidant (2,6-di-tert-butyl-4-hydroxytoluene; BHT) was added, and thereafter the solvent was removed by steam stripping and dry treatment was applied by a dryer to obtain a modified conjugated diene-based polymer (sample F).

As a result of analysis of sample F, the amount of bound styrene was 26 mass % and the amount of bound butadiene was 74 mass %. The Mooney viscosity at 100° C. was 61. The amount of vinyl likage (amount of 1,2-likage) in the microstructure of a butadiene moiety, obtained by calculation in accordance with the Hampton's method based on the measurement results by use of an infrared spectrophotometer was 55%. Furthermore, the modification ratio was 99%. The analysis results of sample F were shown in Table 1.

Example 7

A temperature controllable autoclave (inner volume 10 L) equipped with a stirrer and a jacket was used as a reactor. In the reactor, 1,3-butadiene (762 g), styrene (268 g), cyclohexane (4710 g) and 2,2-bis(2-oxoranyl)propane (1.30 g) as a polar substance, from which impurities were previously removed, were placed and the interior temperature of the reactor was kept at 42° C.

A cyclohexane solution of piperidinolithium (13.0 mmol) (serving as a polymerization initiator), which was previously obtained by reacting piperidine (13.0 mmol) and n-butyllithium (13.0 mmol) in the presence of tetrahydrofuran (26.0 mmol), was supplied to the reactor.

After initiation of a polymerization reaction, the interior temperature of the reactor started increasing by heat generation due to polymerization and the final interior temperature of the reactor reached 79° C. Two minutes after the reaction temperature reached the peak, 2,2-dimethoxy-1-(3-trimethoxysilylpropyl)-1-aza-2-silacyclopentane (3.25 mmol) was added to the reactor, and a modification reaction was carried out for 5 minutes.

To the polymer solution, 2.1 g of an antioxidant (2,6-di-tert-butyl-4-hydroxytoluene; BHT) was added, and thereafter the solvent was removed by steam stripping and dry treatment was applied by a dryer to obtain a modified conjugated diene-based polymer (sample G).

As a result of analysis of sample G, the amount of bound styrene was 26 mass % and the amount of bound butadiene was 74 mass %. The Mooney viscosity at 100° C. was 62. The amount of vinyl likage (amount of 1,2-likage) in the microstructure of a butadiene moiety, obtained by calculation in accordance with the Hampton's method based on the measurement results by use of an infrared spectrophotometer was 56%. Furthermore, the modification ratio was 98%. The analysis results of sample G were shown in Table 1.

Example 8

A temperature controllable autoclave (inner volume 10 L) equipped with a stirrer and a jacket was used as a reactor. In the reactor, 1,3-butadiene (762 g), styrene (268 g), cyclohexane (4710 g) and 2,2-bis(2-oxoranyl)propane (1.30 g) as a polar substance, from which impurities were previously removed, were placed and the interior temperature of the reactor was kept at 42° C.

A cyclohexane solution of 1,2,3,6-tetrahydropiperidinolithium (13.0 mmol) (serving as a polymerization initiator), which was previously obtained by reacting 1,2,3,6-tetrahydropyridine (13.0 mmol) and n-butyllithium (13.0 mmol) in the presence of tetrahydrofuran (26.0 mmol), was supplied to the reactor.

After initiation of the polymerization reaction, the interior temperature of the reactor started increasing by heat generation due to polymerization and the final interior temperature of the reactor reached 79° C. Two minutes after the reaction temperature reached the peak, 2,2-dimethoxy-1-(3-trimethoxysilylpropyl)-1-aza-2-silacyclopentane (3.25 mmol) was added to the reactor, and a modification reaction was carried out for 5 minutes.

To the polymer solution, 2.1 g of an antioxidant (2,6-di-tert-butyl-4-hydroxytoluene; BHT) was added, and thereafter the solvent was removed by steam stripping and dry treatment was applied by a dryer to obtain a modified conjugated diene-based polymer (sample H).

As a result of analysis of sample H, the amount of bound styrene was 26 mass % and the amount of bound butadiene was 74 mass %. The Mooney viscosity at 100° C. was 60. The amount of vinyl likage (amount of 1,2-likage) in the microstructure of a butadiene moiety, obtained by calculation in accordance with the Hampton's method based on the measurement results by use of an infrared spectrophotometer was 55%. Furthermore, the modification ratio was 99%. The analysis results of sample H were shown in Table 1.

Example 9

Sample I was prepared in the same manner as in Example 2 except that 2-methoxy-2-methyl-1-(3-trimethoxysilylpropyl)-1-aza-2-silacyclopentane was used in place of 2,2-dimethoxy-1-(3-trimethoxysilylpropyl)-1-aza-2-silacyclopentane, and the amount added was changed.

As a result of analysis of sample I, the amount of bound styrene was 26 mass % and the amount of bound butadiene was 74 mass %. The Mooney viscosity at 100° C. was 57. The amount of vinyl likage (amount of 1,2-likage) of the microstructure of a butadiene moiety, obtained by calculation in accordance with the Hampton's method based on the measurement results obtained by use of an infrared spectrophotometer was 56%. Furthermore, the modification ratio was 99%. The analysis results of sample I were shown in Table 1.

Example 10

A temperature controllable autoclave (inner volume 10 L) equipped with a stirrer and a jacket was used as a reactor. In the reactor, 1,3-butadiene (762 g), styrene (268 g), cyclohexane (4710 g), hexamethyleneimine (HMI, 13.0 mol) and 2,2-bis(2-oxoranyl)propane (1.45 g) as a polar substance, from which impurities were previously removed, were placed and the interior temperature of the reactor was kept at 42° C.

As a polymerization initiator, n-butyllithium (13.0 mmol) was supplied to the reactor mentioned above.

The n-butyllithium was reacted with the hexamethyleneimine to produce hexamethyleneiminolithium in the reactor.

After initiation of the polymerization reaction, the interior temperature of the reactor started increasing by heat generation due to polymerization and the final interior temperature of the reactor reached 80° C. Two minutes after the reaction temperature reached the peak, 2,2-dimethoxy-1-(3-trimethoxysilylpropyl)-1-aza-2-silacyclopentane (3.25 mmol) was added to the reactor, and a modification reaction was carried out for 5 minutes.

To the polymer solution, 2.1 g of an antioxidant (2,6-di-tert-butyl-4-hydroxytoluene; BHT) was added, and thereafter the solvent was removed by steam stripping and dry treatment was applied by a dryer to obtain a modified conjugated diene-based polymer (sample J).

As a result of analysis of sample J, the amount of bound styrene was 27 mass % and the amount of bound butadiene was 73 mass %. The Mooney viscosity at 100° C. was 58. The amount of vinyl likage (amount of 1,2-likage) in the microstructure of a butadiene moiety, obtained by calculation in accordance with the Hampton's method based on the measurement results by use of an infrared spectrophotometer was 55%. Furthermore, the modification ratio was 97%. The analysis results of sample J were shown in Table 1.

Comparative Examples 1 to 5

Sample K to O were produced in the same manner as in Example 2 except that 2,2-dimethoxy-1-(3-trimethoxysilylpropyl)-1-aza-2-silacyclopentane was used in place of a modifier as shown in Table 1, and the amount of polymerization initiator added, the amount of polar compound added, reaction temperature and the amount of modifier added were set as shown in Table 1.

Analysis of the samples was performed in the same manner as in Example 2 and the analysis results of sample K to 0 were shown in Table 1.

Comparative Example 6

A temperature controllable autoclave (inner volume 10 L) equipped with a stirrer and a jacket was used as a reactor. In the reactor, 1,3-butadiene (762 g), styrene (268 g), cyclohexane (4710 g) and 2,2-bis(2-oxoranyl)propane (1.44 g) as a polar substance, from which impurities were previously removed, were placed and the interior temperature of the reactor was kept at 42° C.

As a polymerization initiator, n-butyllithium (13.0 mmol) was supplied to the reactor. After initiation of the polymerization reaction, the interior temperature of the reactor started increasing by heat generation due to polymerization and the final interior temperature of the reactor reached 80° C.

Two minutes after the reaction temperature reached the peak, 2,2-dimethoxy-1-(3-trimethoxysilylpropyl)-1-aza-2-silacyclopentane (3.25 mmol) was added to the reactor, and a modification reaction was carried out for 5 minutes.

To the polymer solution, 2.1 g of an antioxidant (2,6-di-tert-butyl-4-hydroxytoluene; BHT) was added, and thereafter the solvent was removed by steam stripping and dry treatment was applied by a dryer to obtain a modified conjugated diene-based polymer (sample P).

As a result of analysis of sample P, the amount of bound styrene was 26 mass % and the amount of bound butadiene was 74 mass %. The Mooney viscosity at 100° C. was 61. The amount of vinyl likage (amount of 1,2-likage) in the microstructure of a butadiene moiety, obtained by calculation in accordance with the Hampton's method based on the measurement results by use of an infrared spectrophotometer was 55%. Furthermore, the modification ratio was 90%. The analysis results of sample P were shown in Table 1.

Comparative Example 7

A temperature controllable autoclave (inner volume 10 L) equipped with a stirrer and a jacket was used as a reactor. In the reactor, 1,3-butadiene (762 g), styrene (268 g), cyclohexane (4710 g) and 2,2-bis(2-oxoranyl)propane (1.30 g) as a polar substance, from which impurities were previously removed, were placed and the interior temperature of the reactor was kept at 42° C.

A cyclohexane solution of pyrrolidino lithium (13.2 mmol) (serving as a polymerization initiator), which was previously obtained by reacting pyrrolidine (13.2 mmol) and n-butyllithium (13.2 mmol) in the presence of tetrahydrofuran (26.4 mmol), was supplied to the reactor.

After initiation of the polymerization reaction, the interior temperature of the reactor started increasing by heat generation due to polymerization and the final interior temperature of the reactor reached 75° C. Two minutes after the reaction temperature reached the peak, 2,2-dimethoxy-1-(3-trimethoxysilylpropyl)-1-aza-2-silacyclopentane (3.30 mmol) was added to the reactor, and a modification reaction was carried out for 5 minutes.

To the polymer solution, 2.1 g of an antioxidant (2,6-di-tert-butyl-4-hydroxytoluene; BHT) was added, and thereafter the solvent was removed by steam stripping and dry treatment was applied by a dryer to obtain a modified conjugated diene-based polymer (sample Q).

As a result of analysis of sample Q, the amount of bound styrene was 26 mass % and the amount of bound butadiene was 74 mass %. The Mooney viscosity at 100° C. was 61. The amount of vinyl likage (amount of 1,2-likage) in the microstructure of a butadiene moiety, obtained by calculation in accordance with the Hampton's method based on the measurement results by use of an infrared spectrophotometer was 55%. Furthermore, the modification ratio was 95%. The analysis results of sample Q were shown in Table 1.

TABLE 1

| | | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Sample No | | | A | B | C | D | E | F | G | H | I |
| Polymerization conditions | Butadiene | g | 762 | 762 | 762 | 762 | 762 | 762 | 762 | 762 | 762 |
| | Styrene | g | 268 | 268 | 268 | 268 | 268 | 268 | 268 | 268 | 268 |
| | Cyclohexane | g | 4710 | 4710 | 4710 | 4710 | 4710 | 4710 | 4710 | 4710 | 4710 |
| | Amine — Type of amine | | — | — | — | — | — | — | — | — | — |
| | Amount added | mmol | — | — | — | — | — | — | — | — | — |
| | Lithium equivalent ratio | | — | — | — | — | — | — | — | — | — |
| | Polymerization initiation temperature | ° C. | 42 | 42 | 42 | 42 | 42 | 42 | 42 | 42 | 42 |
| | Polymerization peak temperature | ° C. | 80 | 78 | 83 | 84 | 84 | 85 | 79 | 78 | 79 |
| | Polymerization initiator*1 — Type of polymerization initiator | | DBA-Li | HMI-Li | DBA-Pr-Li | HMI-Pr-Li | DBA-Bt-Li | HMI-Bt-Li | Pp-Li | THP-Li | HMI-Li |
| | Amount added | mmol | 13.0 | 13.0 | 13.3 | 13.2 | 13.4 | 13.3 | 13.0 | 13.0 | 13.0 |
| | Polar compound*2 — Amount added | g | 1.30 | 1.45 | 1.30 | 1.30 | 1.30 | 1.30 | 1.30 | 1.30 | 1.45 |
| | Modifier*3 — Type of modifier | | AS-1 | AS-1 | AS-1 | AS-1 | AS-1 | AS-1 | AS-1 | AS-1 | AS-2 |
| | Amount added | mmol | 3.25 | 3.25 | 3.33 | 3.30 | 3.35 | 3.33 | 3.25 | 3.25 | 4.33 |
| Analysis values | Mooney viscosity (100° C.) | | 58 | 57 | 62 | 59 | 63 | 61 | 62 | 60 | 57 |
| | Amount of bound styrene | mass % | 26 | 26 | 26 | 26 | 26 | 26 | 26 | 26 | 26 |
| | Amount of vinyl likage (amount of 1,2-likage) | mol % | 55 | 56 | 55 | 55 | 55 | 55 | 56 | 55 | 56 |
| | Modification ratio | % | 98 | 99 | 99 | 99 | 98 | 99 | 98 | 99 | 99 |

| | | | Ex. 10 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|
| Sample No | | | J | K | L | M | N | O | P | Q |
| Polymerization conditions | Butadiene | g | 762 | 762 | 762 | 762 | 762 | 762 | 762 | 762 |
| | Styrene | g | 268 | 268 | 268 | 268 | 268 | 268 | 268 | 268 |
| | Cyclohexane | g | 4710 | 4710 | 4710 | 4710 | 4710 | 4710 | 4710 | 4710 |
| | Amine — Type of amine | | HMI | — | — | — | — | — | — | — |
| | Amount added | mmol | 11.7 | — | — | — | — | — | — | — |
| | Lithium equivalent ratio | | 0.9 | — | — | — | — | — | — | — |
| | Polymerization initiation temperature | ° C. | 42 | 42 | 42 | 42 | 42 | 42 | 42 | 42 |
| | Polymerization peak temperature | ° C. | 80 | 80 | 81 | 80 | 82 | 81 | 80 | 75 |
| | Polymerization initiator*1 — Type of polymerization initiator | | NBL | HMI-Li | HMI-Li | HMI-Li | HMI-Li | HMI-Li | NBL | Pr-Li |
| | Amount added | mmol | 13.0 | 13.0 | 13.1 | 13.2 | 13.1 | 7.9 | 13.0 | 13.2 |

TABLE 1-continued

| | Polar compound*2 | Amount added | g | 1.45 | 1.45 | 1.45 | 1.45 | 1.45 | 1.45 | 1.44 | 1.3 |
|---|---|---|---|---|---|---|---|---|---|---|---|
| | Modifier*3 | Type of modifier | | AS-1 | HCDS | BTESE | BTESO | BTMSA | DMAPTES | AS-1 | AS-1 |
| | | Amount added | mmol | 3.25 | 3.25 | 3.28 | 3.30 | 3.28 | 3.96 | 3.25 | 3.30 |
| Analysis values | Mooney viscosity (100° C.) | | | 58 | 61 | 60 | 58 | 63 | 60 | 61 | 61 |
| | Amount of bound styrene | | mass % | 27 | 26 | 26 | 26 | 26 | 26 | 26 | 26 |
| | Amount of vinyl likage (amount of 1,2-likage) | | mol % | 55 | 55 | 55 | 55 | 55 | 55 | 55 | 55 |
| | Modification ratio | | % | 97 | — | — | — | 95 | 93 | 90 | 95 |

With respect to (polymerization initiator*1), (polar compound*2) and (modifier*3) in Table 1 will be described below.
(Polymerization initiator*1)
DBA-Li: dibutylaminolithium
HMI-Li: hexamethyleneiminolithium
DBA-Pr-Li: (3-(dibutylamino)-propyl)lithium
HMI-Pr-Li: (3-(hexamethyleneiminyl)propyl)lithium
DBA-Bt-Li: (4-(dibutylamino)-2-butenyl)lithium
HMI-Bt-Li: (4-(hexamethyleneiminyl)-2-butenyl)lithium
Pp-Li: piperidinolithium
THP-Li: 1,2,3,6-tetrahydropiperidinolithium
NBL: normal butyllithium
HMI: hexamethyleneimine
Pr-Li: pyrrolidino lithium
(Polar compound*2)
2,2-bis-(2-oxoranyl)propane
(Modifier*3)
AS-1: 2,2-dimethoxy-1-(3-trimethoxysilylpropyl)-1-aza-2-silacyclopentane
AS-2: 2-methoxy, 2-methyl-1-(3-trimethoxysilylpropyl)-1-aza-2-silacyclopentane
HCDS: hexachlorodisilane
BTESE: 1,2-bis(3-triethoxysilyl)ethane
BTESO: 1,2-bis(3-triethoxysilyl)octane
BTMSA: bis(3-trimethoxysilylpropyl)-N-methylamine
DMAPTES: 3-(dimethylamino)propyltriethoxysilane Examples 11 to 20

Comparative Examples 8 to 14

Modified conjugated diene-based polymer compositions containing the corresponding raw material rubbers were obtained by using samples (sample A to Q) shown in Table 1 as the raw material rubbers in accordance with the following compositions.
Modified conjugated diene-based polymer (samples A to Q): 100.0 parts by mass,
Silica (Ultrasil 7000GR manufactured by Evonik Degussa GmbH): 75.0 parts by mass
Carbon black (SEAST KH (N339) manufactured by Tokai Carbon Co., Ltd.): 5.0 parts by mass
Silane coupling agent (Si75 manufactured by Evonik Degussa GmbH): 6.0 parts by mass
S-RAE oil (JOMO process NC140 manufactured by JX Nippon Oil & Energy Corporation): 30.0 parts by mass
Wax (SUNNOC N manufactured by OUCHI SHINKO CHEMICAL INDUSTRIAL CO., LTD.): 1.5 parts by mass
Zinc oxide: 2.5 parts by mass
Stearic acid: 2.0 parts by mass
Age resister (N-isopropyl-N'-phenyl-p-phenylenediamine): 2.0 parts by mass
Sulfur: 1.8 parts by mass
Vulcanizing accelerator (N-cyclohexyl-2-benzothiazylsulfin amide): 1.7 parts by mass
Vulcanizing accelerator (diphenylguanidine): 2.0 parts by mass
Total: 229.5 parts by mass
Modified conjugated diene-based polymer compositions were obtained by kneading the aforementioned materials by the following method.
A raw material rubber (samples A to Q), a filler (silica and carbon black), an organic silane coupling agent, process oil, zinc oxide and stearic acid were kneaded by using an airtight kneader (inner volume: 0.3 L) equipped with a temperature control unit, under the conditions of a first-stage kneading: a charge rate of 65% and rotor spinning number: 50/57 rpm. At this time, the temperature of the airtight mixer was controlled. A modified conjugated diene-based polymer composition was obtained at a discharge temperature (blend) of 155 to 160° C.
Subsequently, a second-stage kneading was performed. After the blend obtained above was cooled to room temperature, an age resister was added. The blend was kneaded again in order to improve dispersion of silica. Also in this case, the discharge temperature (blend) was adjusted at 155 to 160° C. by controlling the temperature of the mixer. After cooling, sulfur and a vulcanizing accelerator were added and kneaded (third-stage kneading) by an open roll set at 70° C. Thereafter, the blend was molded and vulcanized by a vulcanization press at 160° C. for 20 minutes.
After the vulcanization, the physical properties of the modified conjugated diene-based polymer compositions were measured. The measurement results of the physical properties were shown in Tables 2 and 3.
After vulcanization was performed as mentioned above, the physical properties of a vulcanizate, i.e., a modified conjugated diene-based polymer composition, were measured by the following method.
(1) Mooney Viscosity of Composition
A Mooney viscometer was used. After preheating was performed at 130° C. for one minute in accordance with JIS K6300-1 and then a rotor was rotated at a rate of two rotations per minute for 4 minutes, viscosity was measured. The results were indexed based on the results of Comparative Example 12 regarded as 100. The smaller the value, the better the processability.
(2) 300% Modulus and Tensile
300% modulus and tensile were determined in accordance with the tension test method of JIS K6251 and indexed based on the results of Comparative Example 12 regarded as 100.

(3) Viscoelasticity Parameter

Viscoelasticity parameters were measured by a viscoelasticity tester (ARES) manufactured by Rheometric Scientific at a torsion mode.

Individual measurement values were indexed based on the values of Comparative Example 12 regarded as 100.

Tan δ measured at 0° C., a frequency of 10 Hz and a strain of 1% was used as an indicator of wet skid performance.

The larger the value, the better the wet skid performance.

Tan δ measured at 50° C., a frequency of 10 Hz and a strain of 3% was used as an indicator of fuel saving properties. The smaller the value, the better the fuel saving performance.

(4) Abrasion Resistance

Amount of abrasion was measured by an Akron abrasion tester (manufactured by Yasuda Seiki Seisakusho, Ltd.) at a load of 44.1 N and at a rotation of 1000 in accordance with JIS K6264-2 and indexed based on the value of Comparative Example 12 regarded as 100. The larger the index, the more excellent the abrasion resistance.

It was also confirmed that the rubber compositions of Examples 11 to 20 have sufficient processability (Mooney viscosity of a blend), abrasion resistance, 300% modulus and tensile in practice.

The present application is based on Japanese Patent Application No. 2011-195867 filed with the Japanese Patent Office on Sep. 8, 2011, the content of which is incorporated herein by reference.

INDUSTRIAL APPLICABILITY

The method for producing a modified conjugated diene-based polymer of the present invention is industrially applicable as a technique for producing a rubber-like polymer constituting a rubber composition suitable for e.g., rubber for tire, vibration-proof rubber and rubber for footwear.

The invention claimed is:

1. A method for producing a modified conjugated diene-based polymer comprising
a polymerization step of obtaining a conjugated diene-based polymer having an active end by polymerizing a conjugated diene compound, or copolymerizing conjugated diene compounds, or copolymerizing a conjugated diene compound and an aromatic vinyl compound by use of a polymerization initiator containing a compound represented by the following chemical formula

TABLE 2

|  |  |  | Example 11 | Example 12 | Example 13 | Example 14 | Example 15 |
|---|---|---|---|---|---|---|---|
| Modified conjugated diene-based polymer |  |  | A | B | C | D | E |
| Physical properties of vulcanizate | Mooney viscosity of composition | Index | 91 | 88 | 93 | 91 | 90 |
|  | 300% Modulus | Index | 100 | 100 | 105 | 107 | 100 |
|  | Tensile | Index | 97 | 98 | 100 | 102 | 99 |
|  | Abrasion resistance | Index | 101 | 100 | 102 | 103 | 100 |
|  | 0° C. tanδ (strain 1%) | Index | 105 | 107 | 105 | 106 | 105 |
|  | 50° C. tanδ (strain 3%) | Index | 85 | 79 | 78 | 75 | 81 |
|  |  |  | Example 16 | Example 17 | Example 18 | Example 19 | Example 20 |
| Modified conjugated diene-based polymer |  |  | F | G | H | I | J |
| Physical properties of vulcanizate | Mooney viscosity of composition | Index | 92 | 89 | 83 | 84 | 85 |
|  | 300% Modulus | Index | 101 | 102 | 100 | 101 | 99 |
|  | Tensile | Index | 101 | 102 | 100 | 101 | 99 |
|  | Abrasion resistance | Index | 104 | 99 | 101 | 100 | 102 |
|  | 0° C. tanδ (strain 1%) | Index | 107 | 104 | 104 | 105 | 104 |
|  | 50° C. tanδ (strain 3%) | Index | 79 | 79 | 80 | 83 | 85 |

TABLE 3

|  |  |  | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|---|
| Modified conjugated diene-based polymer |  |  | K | L | M | N | O | P | Q |
| Physical properties of vulcanizate | Mooney viscosity of composition | Index | 90 | 93 | 98 | 95 | 100 | 80 | 91 |
|  | 300% Modulus | Index | 106 | 102 | 103 | 90 | 100 | 90 | 100 |
|  | Tensile | Index | 105 | 102 | 103 | 100 | 100 | 89 | 101 |
|  | Abrasion resistance | Index | 98 | 96 | 101 | 102 | 100 | 67 | 99 |
|  | 0° C. tanδ (strain 1%) | Index | 99 | 100 | 98 | 102 | 100 | 106 | 99 |
|  | 50° C. tanδ (strain 3%) | Index | 134 | 121 | 119 | 95 | 100 | 105 | 95 |

As shown in Tables 2 and 3, it was confirmed that the modified conjugated diene-based polymer compositions of Examples 11 to 20, compared to the compositions of Comparative Examples 7 to 12, have low tan δ at 50° C. (small hysteresis loss), which demonstrates low rolling-resistance of tire, and further have high tan δ at 0° C., which demonstrates excellent wet skid resistance.

(1) or (2) and having at least one nitrogen atom in a molecule and an organic lithium compound; and a modification step of reacting a modifier represented by the following chemical formula (6) with the active end of the conjugated diene-based polymer:

[Formula 1]

(1)

wherein $R^1$ and $R^2$, which may be the same or different, each represent any selected from the group consisting of an alkyl group having 1 to 12 carbon atoms, a cycloalkyl group having 3 to 14 carbon atoms and an aralkyl group having 6 to 20 carbon atoms; and $R^1$ and $R^2$ may bind to form a cyclic structure together with an adjacent nitrogen atom; and in this case $R^1$ and $R^2$ are hydrocarbon groups having 5 to 12 carbon atoms in total and may have an unsaturated bond and a branched structure:

[Formula 2]

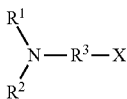
(2)

wherein $R^1$ and $R^2$ are the same as defined in the formula (1); $R^3$ is either an alkylene group having 1 to 20 carbon atoms or a group represented by any one of formulas (3) to (5); when $R^3$ is an alkylene group having 1 to 20 carbon atoms, X represents any one of Cl, Br and I; and when $R^3$ is a group represented by any one of the following formulas (3) to (5), X is a hydrogen atom:

[Formula 3]

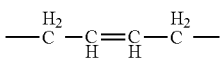
(3)

[Formula 4]

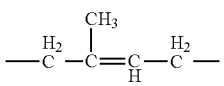
(4)

[Formula 5]

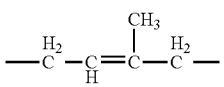
(5)

[Formula 6]

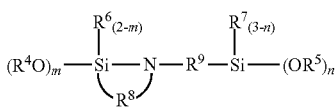
(6)

wherein $R^4$ to $R^7$ each independently represent an alkyl group having 1 to 20 carbon atoms or an aryl group having 6 to 20 carbon atoms; $R^8$ represents an alkylene group having 3 to 10 carbon atoms; $R^9$ represents an alkylene group having 1 to 20 carbon atoms; m is an integer of 1 or 2; and n is an integer of 2 or 3.

2. The method for producing the modified conjugated diene-based polymer according to claim 1, wherein the polymerization initiator to be used in the polymerization step contains an organic lithium compound represented by the following chemical formula (7) or (8) and having, in a molecule, at least one nitrogen atom, which is obtained by reacting the compound having at least one nitrogen atom in a molecule with the organic lithium compound:

[Formula 7]

(7)

wherein $R^1$ and $R^2$, which may be the same or different, each represent any selected from the group consisting of an alkyl group having 1 to 12 carbon atoms, a cycloalkyl group having 3 to 14 carbon atoms and an aralkyl group having 6 to 20 carbon atoms; and $R^1$ and $R^2$ may bind to form a cyclic structure together with an adjacent nitrogen atom; and in this case $R^1$ and $R^2$ are hydrocarbon groups having 5 to 12 carbon atoms in total and may have an unsaturated bond and a branched structure:

[Formula 8]

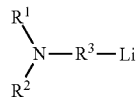
(8)

wherein $R^1$ and $R^2$ are the same as defined in the formula (7); and $R^3$ is an alkylene group having 1 to 20 carbon atoms or represented by any one of the following formulas (3) to (5):

[Formula 9]

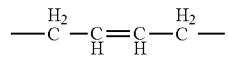
(3)

[Formula 10]

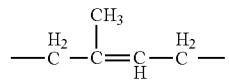
(4)

[Formula 11]

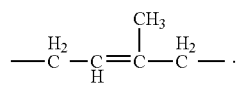
(5)

3. The method for producing the modified conjugated diene-based polymer according to claim 1, wherein the polymerization step comprises a step of obtaining a conjugated diene-based polymer having an active end by simultaneously adding the compound represented by the following chemical formula (1) or (2) and having at least one nitrogen atom in a molecule,
the organic lithium compound, and
the conjugated diene compound or the conjugated diene compound and the aromatic vinyl compound, and performing polymerization or copolymerization:

[Formula 12]

(1)

wherein $R^1$ and $R^2$, which may be the same or different, each represent any selected from the group consisting of an alkyl group having 1 to 12 carbon atoms, a cycloalkyl group having 3 to 14 carbon atoms and an aralkyl group having 6 to 20 carbon atoms; and $R^1$ and $R^2$ may bind to form a cyclic structure together with an adjacent nitrogen atom; and in this case $R^1$ and $R^2$ are hydrocarbon groups having 5 to 12 carbon atoms in total and may have an unsaturated bond and a branched structure:

[Formula 13]

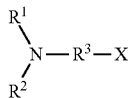
(2)

wherein $R^1$ and $R^2$ are the same as defined in the formula (1); $R^3$ is either an alkylene group having 1 to 20 carbon atoms or a group represented by any one of formulas (3) to (5); when $R^3$ is an alkylene group having 1 to 20 carbon atoms, X represents any one of Cl, Br and I; and when $R^3$ is a group represented by any one of the following formulas (3) to (5), X is a hydrogen atom:

[Formula 14]

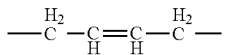
(3)

[Formula 15]

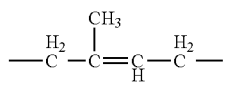
(4)

[Formula 16]

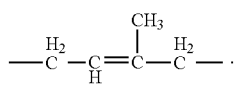
(5)

4. The method for producing the modified conjugated diene-based polymer according to claim 1, wherein in the formula (6), m is 2 and n is 3.

5. The method for producing the modified conjugated diene-based polymer according to claim 2, wherein in the formula (6), m is 2 and n is 3.

6. A modified conjugated diene-based polymer obtained by the method for producing the modified conjugated diene-based polymer according to claim 1.

7. A modified conjugated diene-based polymer obtained by the method for producing the modified conjugated diene-based polymer according to claim 2.

8. A modified conjugated diene-based polymer composition comprising:
100 parts by mass of a rubber component comprising 20 parts by mass or more of the modified conjugated diene-based polymer according to claim 6; and
0.5 to 300 parts by mass of a silica inorganic filler.

9. A modified conjugated diene-based polymer composition comprising:
100 parts by mass of a rubber component comprising 20 parts by mass or more of the modified conjugated diene-based polymer according to claim 7; and
0.5 to 300 parts by mass of a silica inorganic filler.

10. A rubber composition obtained by crosslinking the modified conjugated diene-based polymer composition according to claim 8.

11. A rubber composition obtained by crosslinking the modified conjugated diene-based polymer composition according to claim 9.

12. A tire comprising the rubber composition according to claim 10.

13. A tire comprising the rubber composition according to claim 11.

* * * * *